(12) United States Patent
Kim et al.

(10) Patent No.: US 10,827,536 B2
(45) Date of Patent: Nov. 3, 2020

(54) METHOD AND TERMINAL FOR CREATING, MODIFYING, RELEASING SESSION IN NEXT-GENERATION MOBILE COMMUNICATION

(71) Applicant: LG ELECTRONICS INC., Seoul (KR)

(72) Inventors: Hyunsook Kim, Seoul (KR); Jinsook Ryu, Seoul (KR); Myungjune Youn, Seoul (KR); Dongsoo Kim, Seoul (KR); Sungduck Chun, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 147 days.

(21) Appl. No.: 16/075,806

(22) PCT Filed: Nov. 29, 2016

(86) PCT No.: PCT/KR2016/013841
§ 371 (c)(1),
(2) Date: Aug. 6, 2018

(87) PCT Pub. No.: WO2017/142171
PCT Pub. Date: Aug. 24, 2017

(65) Prior Publication Data
US 2019/0069327 A1 Feb. 28, 2019

Related U.S. Application Data

(60) Provisional application No. 62/296,533, filed on Feb. 17, 2016, provisional application No. 62/318,227, (Continued)

(51) Int. Cl.
*H04W 76/10* (2018.01)
*H04W 80/10* (2009.01)
(Continued)

(52) U.S. Cl.
CPC .............. *H04W 76/10* (2018.02); *H04L 67/14* (2013.01); *H04W 60/00* (2013.01); *H04W 60/06* (2013.01);
(Continued)

(58) Field of Classification Search
CPC . H04W 36/14; H04W 76/046; H04W 72/082; H04W 28/08; H04W 76/12;
(Continued)

(56) References Cited

U.S. PATENT DOCUMENTS 9,253,704 B1\* 2/2016 Sarkar .................. H04W 36/00
2005/0169249 A1\* 8/2005 Shirota ............... H04L 12/1859
370/352
(Continued)

FOREIGN PATENT DOCUMENTS

| KR | 1020100120259 | 11/2010 |
|---|---|---|
| KR | 1020150040989 | 4/2015 |
| WO | 2012059137 | 5/2012 |

OTHER PUBLICATIONS

European Patent Office Application Serial No. 16890761.6, Search Report dated Sep. 26, 2019, 13 pages.
(Continued)

*Primary Examiner* — Jung Liu
(74) *Attorney, Agent, or Firm* — Lee, Hong, Degerman, Kang & Waimey

(57) ABSTRACT

One disclosure of the present specification provides a method for a control plane (CP) function entity creating a session, the CP function entity being in charge of managing a session in a next-generation mobile communication network. The method may comprise the steps of: receiving a connectivity request message from a terminal if the creation of a session is not included in a process by which the terminal attaches to a core network of the next-generation
(Continued)

mobile communication; on the basis of information on the type of service to be provided to the terminal, deciding to create, for the terminal, a session that needs to be always-on, or in other words, always-connected; and transmitting, to the terminal, a connectivity completion message including information indicating the session that needs to be always-on, or in other words, always-connected.

18 Claims, 24 Drawing Sheets

Related U.S. Application Data filed on Apr. 5, 2016, provisional application No. 62/417,445, filed on Nov. 4, 2016.

(51) Int. Cl.
*H04W 76/25* (2018.01)
*H04W 60/00* (2009.01)
*H04W 76/12* (2018.01)
*H04L 29/08* (2006.01)
*H04W 60/06* (2009.01)
*H04W 76/27* (2018.01)
*H04W 76/22* (2018.01)
*H04L 12/14* (2006.01)

(52) U.S. Cl.
CPC ........... *H04W 76/12* (2018.02); *H04W 76/25* (2018.02); *H04W 76/27* (2018.02); *H04W 80/10* (2013.01); *H04L 12/1407* (2013.01); *H04W 76/22* (2018.02)

(58) Field of Classification Search
CPC ..... H04W 76/27; H04W 76/11; H04W 8/065; H04W 36/0022; H04W 24/04; H04W 72/0406; H04W 76/25; H04L 1/1861; H04L 1/1854; H04L 1/1671; Y02D 70/1262; Y02D 70/164; Y02D 70/1242; Y02D 70/142; Y02D 70/144; Y02D 70/23; Y02D 70/1226; Y02D 70/1224
See application file for complete search history.

(56) References Cited

U.S. PATENT DOCUMENTS

| | | |
|---|---|---|
| 2008/0233947 A1 | 9/2008 | Herrero-Veron |
| 2009/0239526 A1 | 9/2009 | Zhao et al. |
| 2012/0202491 A1* | 8/2012 | Fox ................... H04W 12/0017 455/435.1 |
| 2012/0246325 A1* | 9/2012 | Pancorbo Marcos ........................ H04L 63/102 709/227 |
| 2012/0294236 A1 | 11/2012 | Watfa et al. |
| 2013/0143559 A1 | 6/2013 | Nishida et al. |
| 2014/0064209 A1* | 3/2014 | Anchan ............. H04W 72/0406 370/329 |
| 2014/0362775 A1* | 12/2014 | Steiner ................ G06F 9/45558 370/329 |
| 2015/0223284 A1 | 8/2015 | Jain et al. |
| 2015/0257115 A1 | 9/2015 | Jokimies et al. |
| 2015/0264739 A1 | 9/2015 | Hurtta |
| 2016/0050601 A1* | 2/2016 | Jeong .................... H04W 36/14 455/436 |
| 2017/0171782 A1* | 6/2017 | Mohamed ......... H04W 36/0011 |
| 2017/0288886 A1* | 10/2017 | Atarius ............... H04L 12/1407 |
| 2018/0295659 A1* | 10/2018 | Shan .................... H04W 76/12 |
| 2019/0069327 A1 | 2/2019 | Kim et al. |
| 2020/0015304 A1 | 1/2020 | Ma |

OTHER PUBLICATIONS

European Patent Office Application Serial No. 16890762.4, Search Report dated Sep. 26, 2019, 12 pages.
3rd Generation Partnership Project (3GPP), "Technical Specification Group Services and System Aspects; Study on Architecture for Next Generation System (Release 14)," 3GPP TR 23.799 V0.2.0, Feb. 2016, 17 pages.
PCT International Application No. PCT/KR2016/013841, International Search Report dated Feb. 23, 2017, 4 pages.
United States Patent and Trademark Office Application No. 15/999,591, Office Action dated Jan. 28, 2020, 19 pages.
U.S. Appl. No. 15/999,591, Notice of Allowance dated Jun. 12, 2020, 15 pages.

* cited by examiner

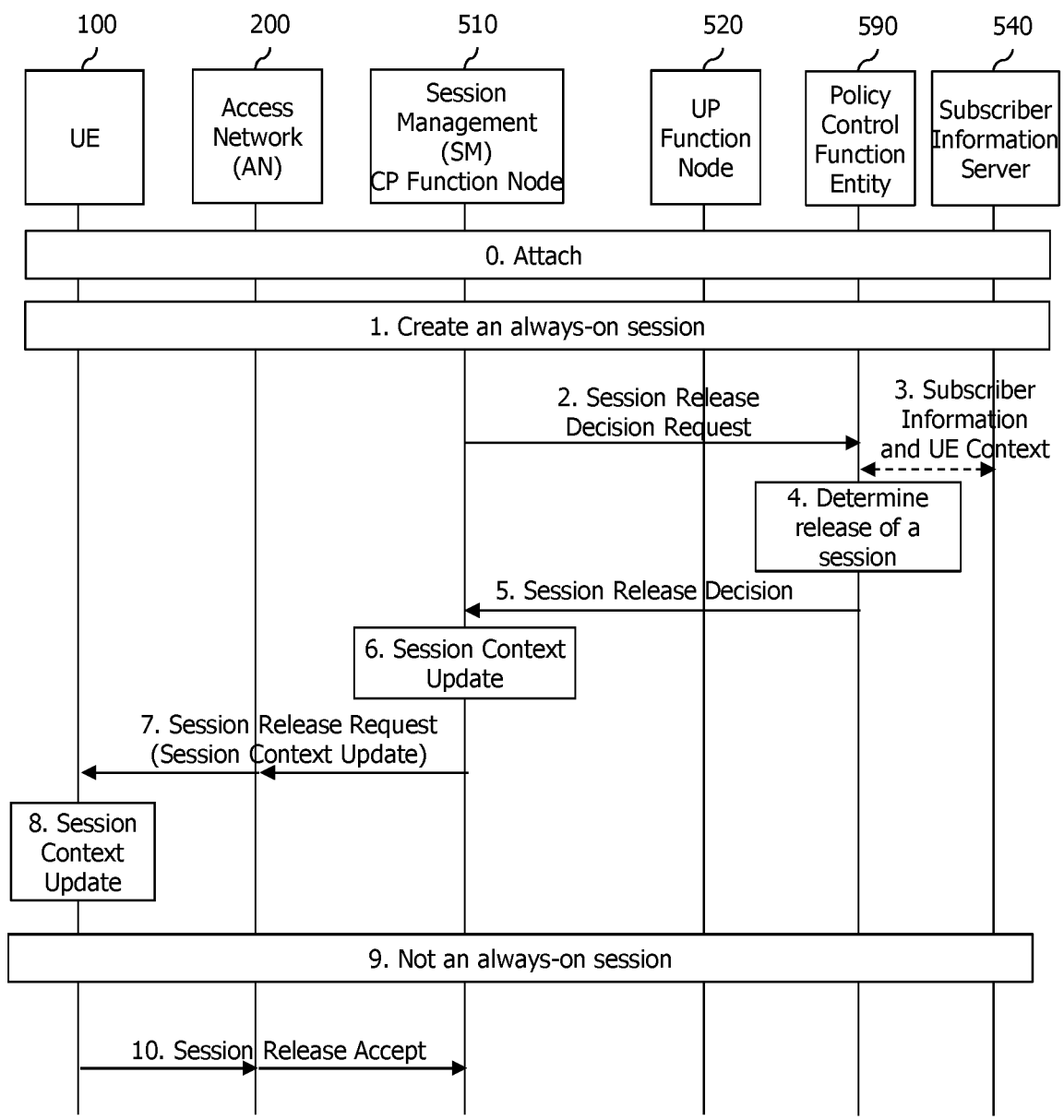

METHOD AND TERMINAL FOR CREATING, MODIFYING, RELEASING SESSION IN NEXT-GENERATION MOBILE COMMUNICATION

CROSS-REFERENCE TO RELATED APPLICATIONS

This application is the National Stage filing under 35 U.S.C. 371 of International Application No. PCT/KR2016/013841, filed on Nov. 29, 2016, which claims the benefit of U.S. Provisional Applications No. 62/296,533, filed on Feb. 17, 2016, 62/318,227, filed on Apr. 5, 2016 and 62/417,445, filed on Nov. 4, 2016, the contents of which are all hereby incorporated by reference herein in their entirety.

BACKGROUND OF THE INVENTION

Field of the Invention

The present invention relates to a next generation mobile communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (the S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or the P-GW) 53 corresponds to the termination point of a data interface toward a packet data network. The PDN GW 53 can support policy enforcement features, packet filtering, charging support, etc. Furthermore, the PDN GW (or the P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are presented in the different function entities of an E-UTRAN and an EPC is called a reference point. Table 1 below defines reference points shown in FIG. 1. In addition to the reference points shown in the example of Table 1, various reference points may be presented depending on a network configuration.

TABLE 1

| Reference point | Description |
|---|---|
| S1-MME | Reference point for the control plane protocol between E-UTRAN and the MME |
| S1-U | Reference point between E-UTRAN and Serving GW for the per bearer user plane tunnelling and inter an eNodeB path switching during handover) |
| S3 | It enables user and bearer information exchange for inter 3GPP access network mobility in Idle and/or active state. This reference point can be used intra-PLMN or inter-PLMN (e.g. in the case of Inter-PLMN HO). |

TABLE 1-continued

| Reference point | Description |
|---|---|
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | A reference point between the MME and the S-GW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UTRAN and a common the EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the transmitter side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are presented in the physical layer of the transmitter side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are presented in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for transmitting, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently transmit an IP packet, such as IPv4 or IPv6, in a radio section having a small bandwidth when transmitting the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is presented between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

Meanwhile, in FIG. 3, the RRC layer, the RLC layer, the MAC layer, and the PHY layer placed under the NAS layer are also collectively called an Access Stratum (AS).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5*b* illustrates a connection process in a radio resource control (RRC) layer.

FIG. 5*b* shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, in the next-generation mobile communication, so-called the fifth-generation mobile communication, it is expected to transmit and receive data of a larger capacity at high speed. To this end, the core network needs to be improved.

Also, in the next-generation mobile communication, during an attach procedure for attaching a UE to the core network, a connectivity request procedure for creating a session may or may not be performed additionally. On the other hand, in the fourth-generation mobile communication of the existing LTE/LTE-A system, the connectivity request procedure has been performed necessarily without exception to create a session for a default bearer during the attach procedure so that voice communication data may be available for incoming or outgoing calls at any time. However, since the next-generation mobile communication is aimed to transmit and receive intermittent Internet of Things (IoT) data in an efficient manner, a session does not have to be created during the attach procedure nor does the session need to be maintained.

SUMMARY OF THE INVENTION

Therefore, the present invention is intended to provide a method for creating, modifying, and releasing a session efficiently in the next-generation mobile communication.

To achieve the foregoing purposes, the disclosure of the present specification proposes a method for creating a session by a control plane (CP) function entity responsible for session management in a next generation mobile communication network. The method may comprise: if session creation is not involved while a UE is attached to a core network of the next generation mobile communication, receiving a connectivity request message from the UE; determining to create a session which needs to be always-on or always-connected for the UE, based on type information of a service to be provided to the UE; and transmitting a connectivity complete message comprising information indicating the always-on or always-connected session to the UE.

The determining may be performed on the basis of one or more of the UE type, preconfigured information, and policy information of a service provider.

The determining may comprise: transmitting a policy information request comprising a request for the decision to a policy control function (PCF) entity; and receiving a policy information response comprising a decision result.

If it is determined to release the session which needs to be always-on or always-connected, the method may further comprise updating session context to change attribute of the session into that of a session which needs not be always-on or always-connected.

The method may further comprise: transmitting a session modification request message to the UE to request modification of attribute of the session; and after receiving a session modification response message from the UE, transmitting a session release request message to the UE.

The method may further comprise: after updating the session context, transmitting a session release request message to the UE. The session release request message may comprise a request requesting the UE to update session context to modify attribute of the session into that of a session which needs not be always-on or always-connected.

The method may further comprise: transmitting a request requesting to make a decision about whether to release the session which needs to be always-on or always-connected to a policy control function (PCF) entity; and receiving a decision result by the PCF entity.

The method may further comprise: receiving a session release request message requesting release of the session from the UE; transmitting a session release reject message comprising rejection cause information indicating that the session is the one which needs to be always-on or always-connected to the UE; receiving a session modification request message from the UE to modify the session into one which needs not be always-on or always-connected; updating context of the session for modifying the session into one which needs not be always-on or always-connected; and transmitting a response message in response to a session modification request which induces session context update of the UE.

The method may further comprise: receiving a session release request message requesting release of the session from the UE; updating context of the session for modifying the session into one which needs not be always-on or always-connected; and transmitting a session release reject message comprising a request requesting to change the session into one which needs not be always-on or always-connected to the UE.

To achieve the foregoing purposes, the disclosure of the present specification proposes a control plane (CP) function entity for session management in a next generation mobile communication network. The CP function entity may comprise: a transmission and reception unit and a processor controlling the transmission and reception unit. The processor may be configured to receive a connectivity request message through the transmission and reception unit if session creation is not involved while a UE is attached to a core network of the next generation mobile communication. The processor may be configured to determine to create a session which needs to be always-on or always-connected for the UE, based on type information of a service to be provided to the UE. The processor may be configured to transmit a connectivity complete message comprising information indicating the always-on or always-connected session to the UE through the transmission and reception unit.

According to the disclosure of the present specification, creation, modification, and release of a session may be performed efficiently in the next-generation mobile communication system.

BRIEF DESCRIPTION OF THE DRAWINGS

FIG. 20 illustrates a process for a network's requesting release of the corresponding session according to a third embodiment of the third disclosure of the present specification.

DESCRIPTION OF EXEMPLARY EMBODIMENTS

Figure 1:
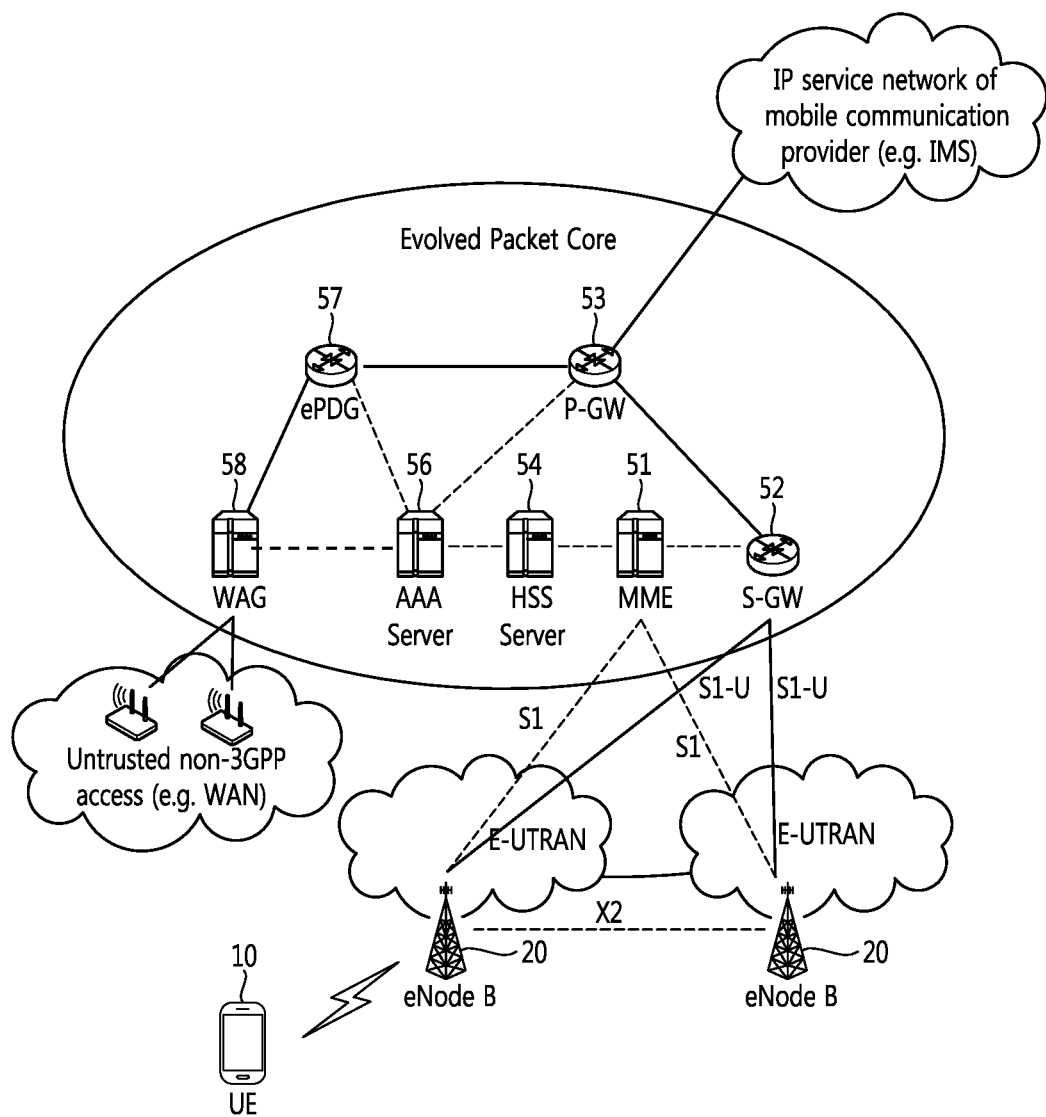
FIG. 1 is a structural diagram of an evolved mobile communication network.
Figure 2:
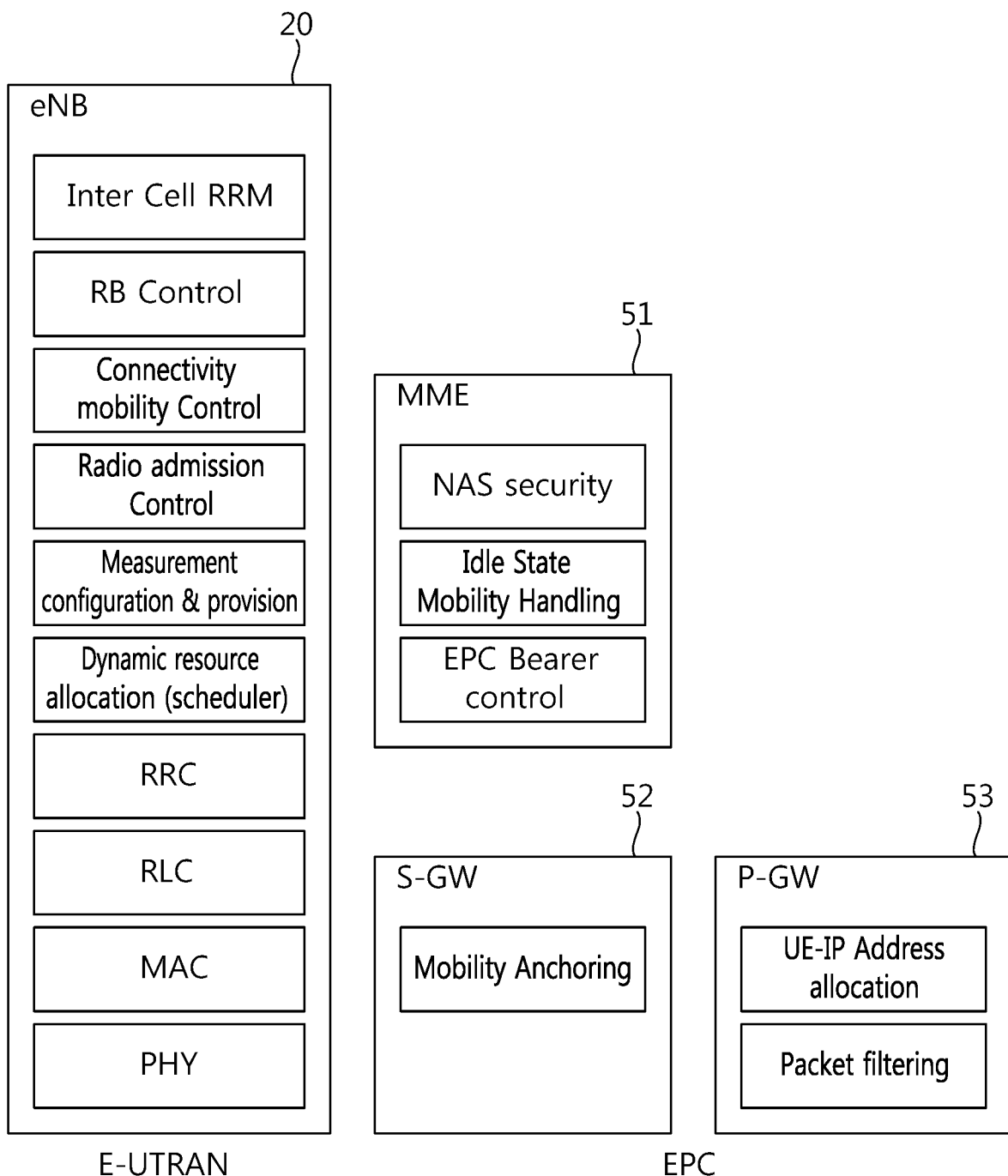
FIG. 2 is an exemplary diagram illustrating architectures of a general E-UTRAN and a general EPC.
Figure 3:
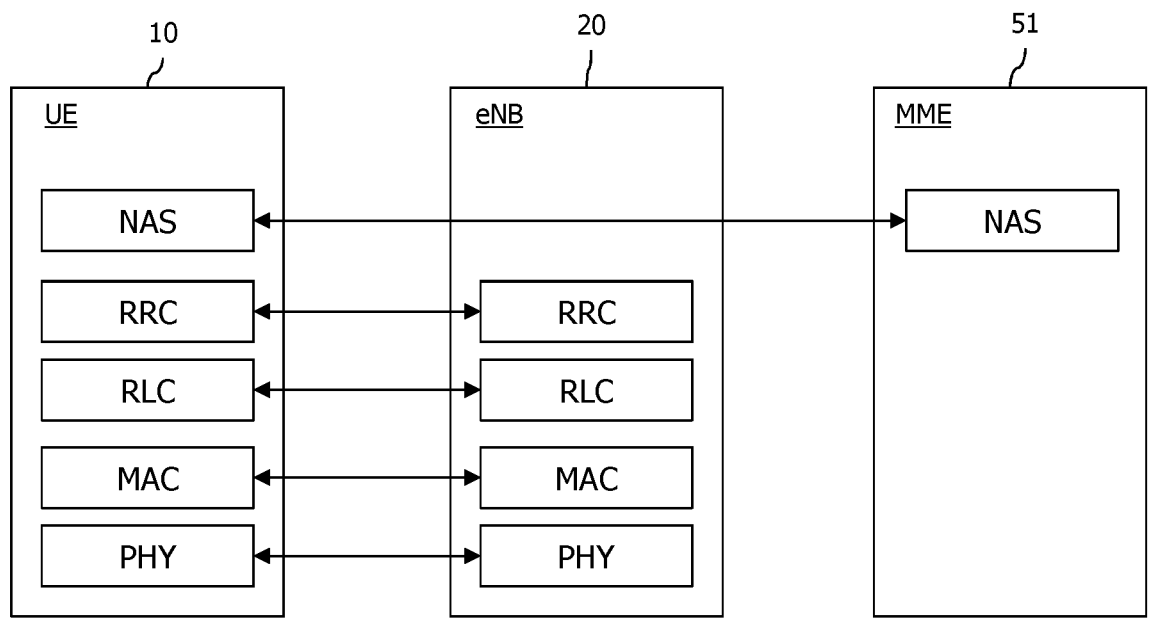
FIG. 3 is an exemplary diagram illustrating a structure of a radio interface protocol on a control plane between UE and eNodeB.
Figure 4:
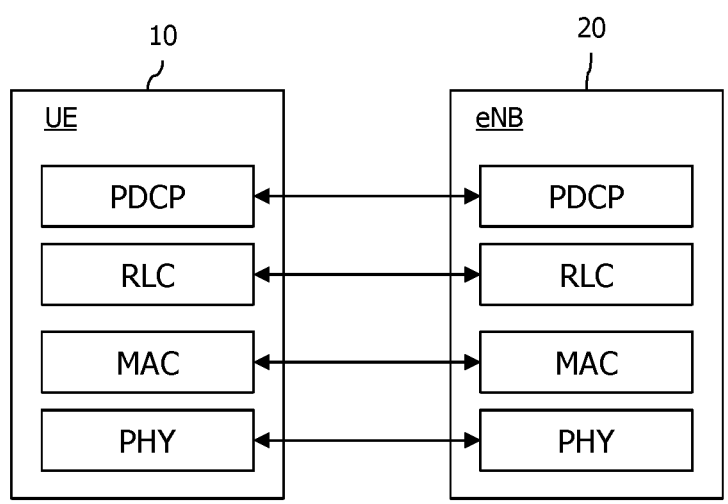
FIG. 4 is another exemplary diagram illustrating a structure of a radio interface protocol on a user plane between the UE and a base station.
Figure 5A:
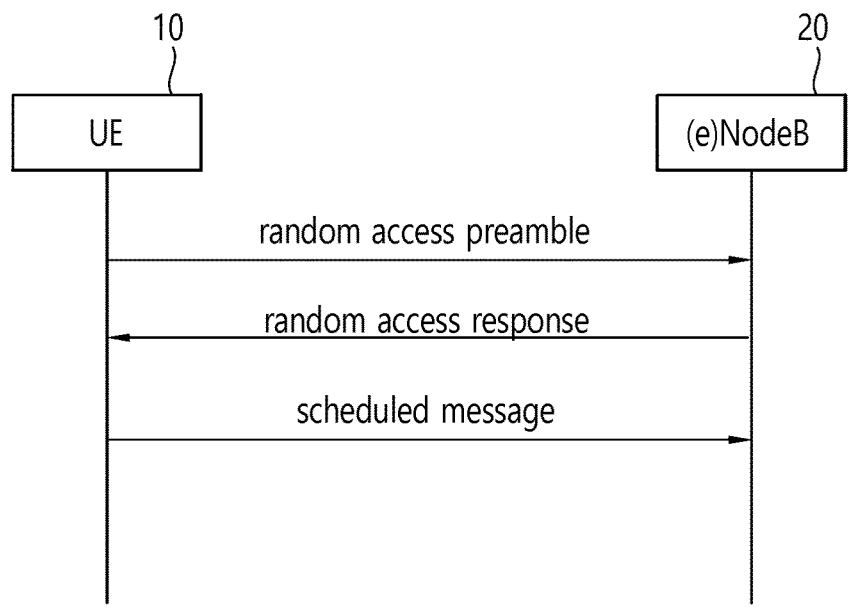
FIG. 5a is a flowchart illustrating a random access process in 3GPP LTE.
Figure 5B:
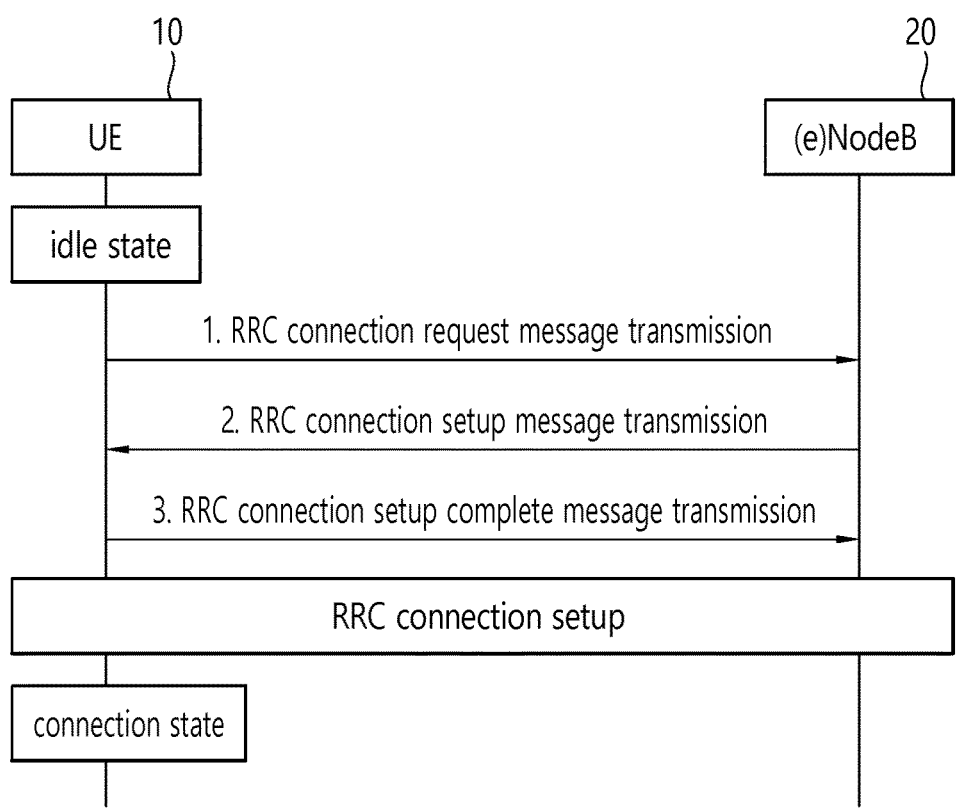
FIG. 5b illustrates a connection process in a radio resource control (RRC) layer.

The present invention is described with respect to the Universal Mobile Telecommunication System (UMTS) and Evolved Packet Core (EPC), but the present invention is not limited only to the specific communication system. Therefore, the present invention may be applied to all kinds of communication systems and methods to which the technical principles may be applied.

The technical terms used in the present specification have been introduced solely for the purpose of describing a specific embodiment, and it should be noted that the terms are not intended to restrict the technical scope of the present invention. Also, unless defined explicitly otherwise, the technical terms used in the present specification should be interpreted to have the same meaning as understood generally by those skilled in the art to which the present invention belongs but should not be interpreted to have excessively comprehensive or simplified meaning. Also if a technical term used in the present specification turns out to have been wrongly used, failing to convey the technical principles of the present invention, it should be replaced with other technical term which may be understood correctly by those skilled in the art. Also, ordinary terms used in the present specification should be interpreted according as defined in the dictionary or according to the preceding or succeeding context but not as having excessively reduced meaning.

Also, a singular expression used in the present specification should be understood to indicate a plural expression unless otherwise explicitly stated. The term 'comprise' or 'have' should not be interpreted as necessarily including all of various constituting elements or steps disclosed in the present specification; the present invention may not include part of the constituting elements or steps or may further include additional constituting elements or steps.

Also, terms including an ordinal number such as first or second may be used to describe various constituting elements of the present specification, but the constituting elements should not be limited by the terms. Those terms are used only for the purpose of distinguishing one constituting element from the others. For example, without departing from the technical scope of the present invention, a first constituting element may be called a second constituting element and vice versa.

If a constituting element is said to be connected or attached to other constituting element, the former may be connected or attached directly to the other constituting element, but there may be a case in which another constituting element is present between the two constituting elements. On the other hand, if a constituting element is said to be directly connected or attached to other constituting element, it should be understood that there is no other constituting element between the two constituting elements.

In what follows, preferred embodiments according to the present invention will be described in detail with reference to appended drawings, where the same or similar constituting elements are given the same reference number irrespective of their drawing symbols, and repeated descriptions thereof will be omitted. Also, in describing the present invention, if it is determined that a detailed description of a related art incorporated herein unnecessarily obscure the gist of the present invention, the detailed description thereof will be omitted. Also, it should be understood that the appended drawings are intended only to help understand the technical principles of the present invention and do not limit the technical principles of the present invention. It should be understood that the technical principles of the present invention are expanded by including all of the modifications, equivalents or substitutes in addition to the appended drawings.

The appended drawings depict a user equipment (UE) in various examples; however, the depicted UE may be referred to as a term such as UE 100 (terminal) or mobile equipment (ME). Also, the UE may be a portable device such as a notebook computer, mobile phone, PDA, smart phone, or multimedia device; or a non-mobile device such as a PC or a vehicle-mounted device.

Definitions of Terms

In what follows, before describing the present invention with reference to appended drawings, terms used in the present specification will be defined briefly to help understand the present invention.

UMTS: Abbreviation for Universal Mobile Telecommunication System. Refers to the third-generation mobile communication network.

UE/MS: User Equipment/Mobile Station. Refers to a UE (100) device.

EPS: Abbreviation for Evolved Packet System. Refers to a core network supporting the Long Term Evolution (LTE) network. A network evolved from the UMTS.

Public Data Network (PDN): An independent network in which a service-providing server is located.

Packet Data Network Gateway (PDN-GW): A network node in the EPS network, which performs a UE IP address allocation, packet screening & filtering, and charging data collection functions.

Serving Gateway (GW): A network node in the EPS network, which performs a mobility anchor, packet routing, idle mode packet buffering, and triggering MME to page UE functions.

Policy and Charging Rule Function (PCRF): A node in the EPS network, which performs a policy decision for dynamically applying a QoS and charging policies differentiated for each service flow.

NodeB: A base station of the UMTS network. Installed outdoors and cell coverage corresponds to the size of a macro cell.

eNodeB: A base station of the Evolved Packet System (EPS). Installed outdoors and cell coverage corresponds to the size of a macro cell.

(e)NodeB: A term used to refer to NodeB and eNodeB.

MME: Abbreviation for Mobility Management Entity which performs the role of controlling each entity within the EPS to provide a session and mobility for a UE.

Session: A session is a path for data transmission the unit of which may be PDN, bearer, or IP flow. As defined in the 3GPP, the units are distinguished according to their use: the unit for the whole target network (APN or PDN unit), unit distinguished by QoS within the whole network unit (bearer unit), and unit for destination IP address.

PDN connection: Connection from a UE 100 to the PDN. In other words, a PDN connection represents association (connection) between the UE 100 represented by an IP address and the PDN represented by an APN. A PDN connection indicates a connection (UE 100-PDN GW) between entities in a core network to form a session.

UE context: Situation information of a UE used for managing UEs in the network, namely situation information comprising UE ID, mobility (current location), properties of a session (QoS, priority, and so on).

Non-Access-Stratum (NAS): The upper stratum of the control plane between a UE and an MME. NAS supports mobility management, session management, and IP address maintenance between the UE and the network.

PLMN: Abbreviation for Public Land Mobile Network. Represents a network identification number of a service provider. In a roaming situation of a UE, PLMN is distinguished by Home PLMN (HPLMN) and Visited PLMN (VPLMN).

<Core Network for the Next-Generation Mobile Communication>

Meanwhile, in the next-generation mobile communication, so-called the fifth generation mobile communication, a data service with a minimum speed of 1 Gbps is supposed to be realized. Accordingly, the overload on the mobile communication core network is expected to be further increased.

Therefore, in the so-called fifth generation mobile communication, re-design of the core network is highly required.

Figure 6A:
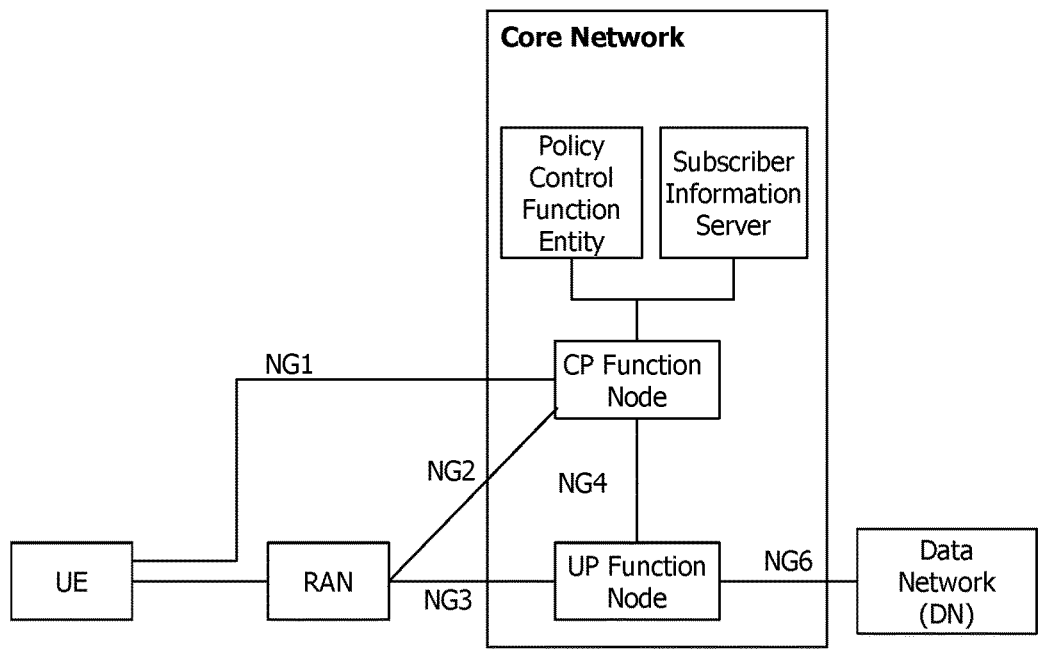
FIG. 6a illustrates an expected structure of the next-generation mobile communication system in terms of nodes.

FIG. 6a illustrates an expected structure of the next-generation mobile communication system in terms of nodes.

As may be seen from FIG. 6a, a UE may be attached to the core network through the next-generation Radio Access Network (RAN). The next-generation core network may include a control plane (CP) function node and a user plane (UP) function node. The CP function node manages UP function nodes and RAN and transmits and receives a control signal. The CP function node performs the whole or part of the functions of the MME in the fourth generation mobile communication; and the whole or part of the CP functions of the S-GW and P-GW. The UP function node may perform the whole or part of the UP functions of the S-GW and P-GW in the fourth generation mobile communication.

The depicted Policy Control Function (PCF) is a node which controls the policy of a service provider. And the depicted subscriber information server stores subscription information of users.

Figure 6B:
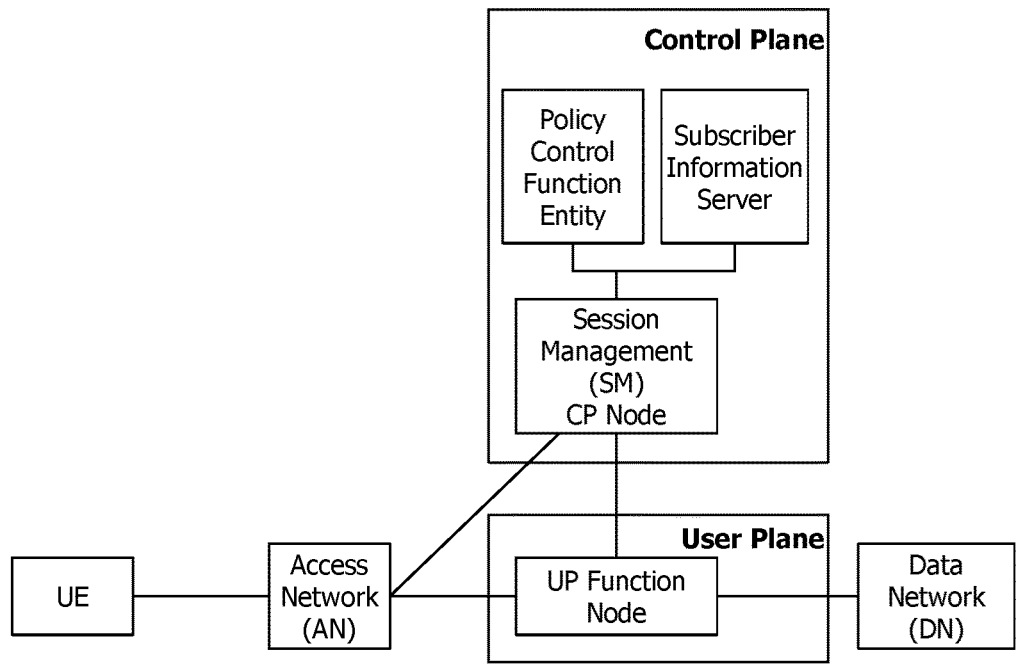
FIG. 6b illustrates an expected structure of the next-generation mobile communication system in terms of session management.

FIG. 6b illustrates an expected structure of the next-generation mobile communication system in terms of session management.

As shown in the figure, the core network is divided into the control plane (CP) and the user plane (UP). The control plane (CP) may include a policy control function (PCF) entity, subscriber information server, and CP node which performs session management (SM). And the UP may include a UP function node. Nodes within the CP are implemented through cloud virtualization. In the same way, nodes within the UP are implemented through cloud virtualization.

The UE may request creation of a session directed to a data network (DN) through an access network (AN). The session may be created and managed by the CP node which performs the session management (SM). At this time, the session management may be performed on the basis of the information stored in the subscriber information server and the policy of a service provider stored in the policy control function (PCF) entity. In other words, if the CP node which performs the session management (SM) receives a request for creation/modification/release of a session from the UE, obtains the information by interacting with the subscriber information server and the policy control function (PCF), and creates/modifies/releases the session. Also, the CP node which performs the session management (SM) selects a UP function node for the session and allocates a resource of the core network. Also, the CP node which performs the session management (SM) may directly allocate an IP address to the UE or request the UP function node to allocate an IP address to the UE.

<The Distinction Between a Session Needed to be Always-on or Always-Connected from One that is Not>

In the next-generation mobile communication, it may be necessary that sessions needed to be always-on or always-connected should be distinguished from those that are not. For example, since the voice/video call service needs to be capable of making an outgoing call/receiving an incoming call promptly at any time and is sensitive to delay, a session needed to be always-on or always-connected is required. On the other hand, since an Internet service is delay-tolerant, a session may be created each time it is needed.

If a session needed to be always-on or always-connected is needed depending on the service type, the UE may request the session from the network, and while being connected to the network, the UE maintains and manages the context of the always-on or always-connected session.

The always-on or always-connected session may be managed as follows.

Until the UE 100 is detached from the network, the session is not released, and the context of the session is maintained.

If the UE 100 requests release of a session/flow release through a procedure similar to the bearer resource modification procedure in the prior art, the network may reject the request. At this time, the network may inform that the network is managed by always-on or always-connected sessions.

The network does not attempt to release a bearer or session/flow through a procedure similar to the bearer deactivation procedure of the prior art.

However, by changing the attribute of a session, the UE or network may determine whether to manage the session as the always-on or always-connected session.

Disclosures of the Present Specification

I. First Disclosure of the Present Specification

In what follows, the first disclosure of the present specification describes with reference to related drawings a process of attachment to the network and a process for creating/modifying/releasing a session which needs to be always-on or always-connected in the next-generation mobile communication.

Figure 7:
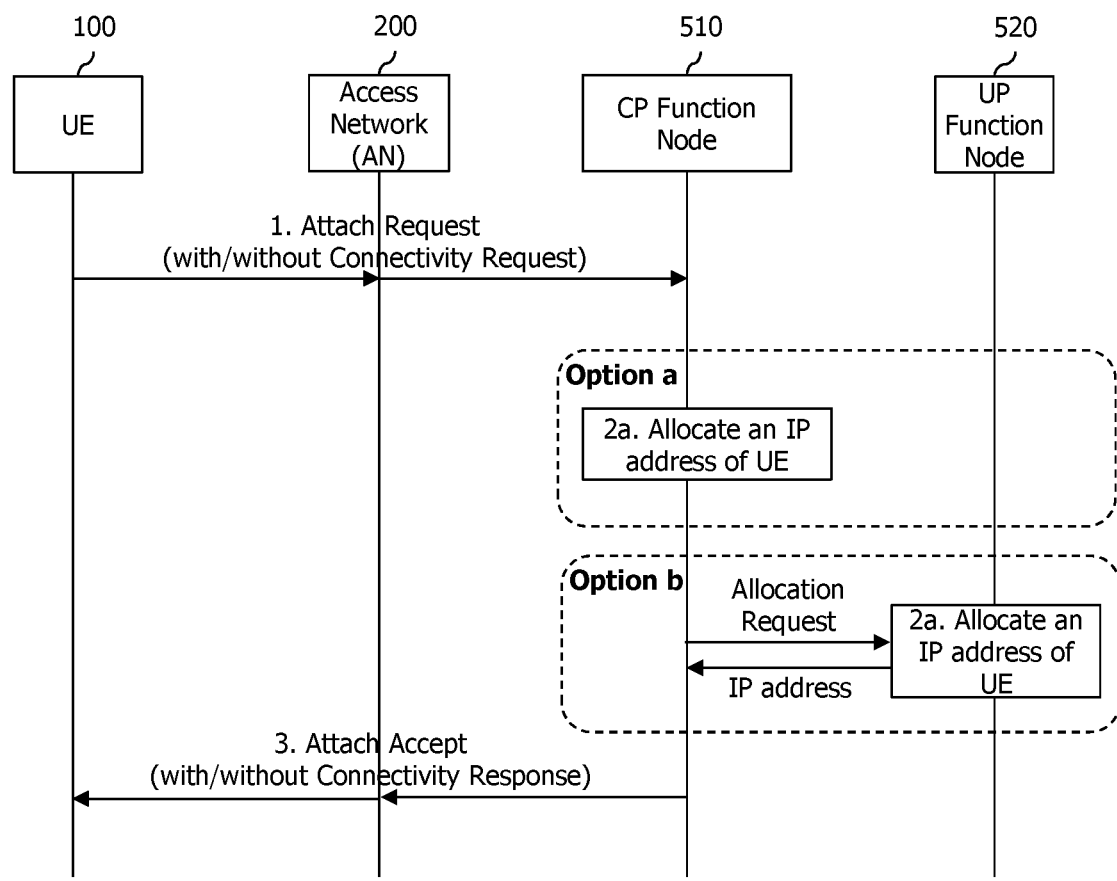
FIG. 7 illustrates a process of a UE's performing an attach procedure.

FIG. 7 illustrates a process of a UE's performing an attach procedure.

As described above, in the next-generation mobile communication, a connectivity request procedure for creating a session may or may not be performed during the attach procedure. On the other hand, in the fourth mobile communication of the existing LTE/LTE-A system, the connectivity request procedure for creating a session has necessarily been requested during the attach procedure. The procedure above may be described more specifically as follows.

First, the UE 100 transmits an attach request message to the CP function node 510 including a session management (SM) function and/or mobility management (MM) function to initiate the attach procedure. At this time, the UE 100 may include a connectivity request message in the attach request message only when a session needs to be established immediately as the UE has data to be transmitted. On the other hand, if there is no data to be transmitted and no need to establish a session, the UE 100 may not include the connectivity request message. The connectivity request message may include session type information which indicates whether the UE requests an IP session or a non-IP session. Also, the connectivity request message may include information indicating whether a session needed to be always-on or always-connected is requested. Or the connectivity request message may include type information of a service.

If the CP function node 510 receives the attach request message, the CP function node checks whether the connectivity request message for requesting creation of a session is included. If the session type is the IP session, the CP function node may directly allocate an IP address to the UE or after selecting an appropriate UP function node, may request the selected UP function node to allocate the IP address. Also, if the connectivity request message includes information requesting the session which needs to be always-on or always-connected, the CP function node 510 manages a created session as one which needs to be always-on or always-connected. Similarly, if the connectivity request message does not include information requesting a session which needs to be always-on or always-connected, the CP function node 510 determines on the basis of the service type information within the connectivity request message whether the session to be created has to be always-on or always-connected.

Afterwards, the CP function node 510 transmits an attach accept message to the UE 100. If the attach request message includes the connectivity request message for requesting creation of a session, the attach accept message includes a connectivity response message.

Figure 8:
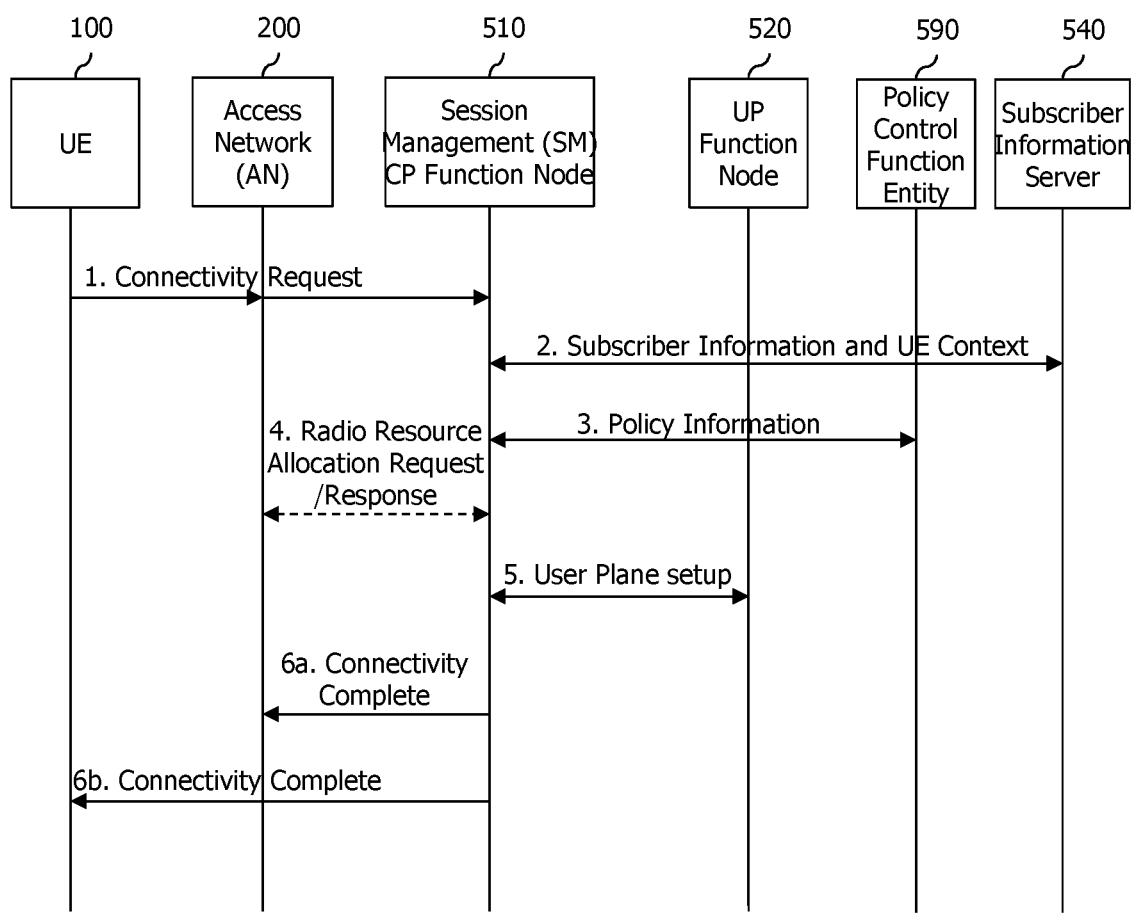
FIG. 8 illustrates a separate process performed when a connectivity request procedure for creating a session is not performed together while the attach procedure of FIG. 7 is performed.

FIG. 8 illustrates a separate process performed when a connectivity request procedure for creating a session is not performed together while the attach procedure of FIG. 7 is performed.

If a connectivity request procedure has not been performed together during the attach procedure of FIG. 7, and a session needs to be created as the UE 100 currently has data to transmit, the UE 100 transmits a connectivity request message for creation of a session to the CP function node 510 for session management (SM). The connectivity request message may include session type information indicating whether the UE requests an IP session or a non-IP session. Also, the connectivity request message may include information indicating whether an always-on or always-connected session is needed. Or the connectivity request message may include type information of a service.

Then the CP function node 510 for session management (SM) obtains subscriber information and context of the UE from the subscriber information server 540. And the CP function node 510 for session management obtains policy information of a service provider from the policy control function (PCF).

The CP function node 510 for session management (SM) determines Quality of Service (QoS) on the basis of the information about session type requested by the UE and the obtained information. And the CP function node 510 for session management (SM) requests the access network (AN) to allocate radio resources.

Next, the CP function node 510 for session management (SM) selects an appropriate UP function node for the user plane. And the CP function node 510 for session management lets the UP function node set up the user plane. At this time, if the session type indicates an IP session, the CP function node for session management may directly allocate an IP address to the UE or after selecting an appropriate UP function node, request the selected UP function node to allocate an IP address. Also, if the connectivity request message includes information requesting the always-on or always-connected session, the CP function node 510 for session management (SM) manages a created session as one which needs to be always-on or always-connected. Or if the information requesting the always-on or always-connected session is not included in the connectivity request message, the CP function node 510 for session management (SM) determines on the basis of the service type information within the connectivity request message whether the created session needs to be always connected.

Next, the CP function node 510 for session management transmits a connectivity complete message to the UE and the access network (AN). At this time, if the session type requested by the UE is the IP session, the connectivity complete message includes an IP address.

Meanwhile, the following are the information which may be included in the connectivity request message by the UE. The information may be preconfigured information within the UE or information which has been obtained previously from the network and processed by the UE.

Reference information about the network, by which the UE accesses the network for a requested service Information about requested service types (for example, eMBB, eV2X, and VoLTE)

Information indicating explicitly or implicitly whether a session which needs to be always-on or always-connected is requested.

Figure 9:
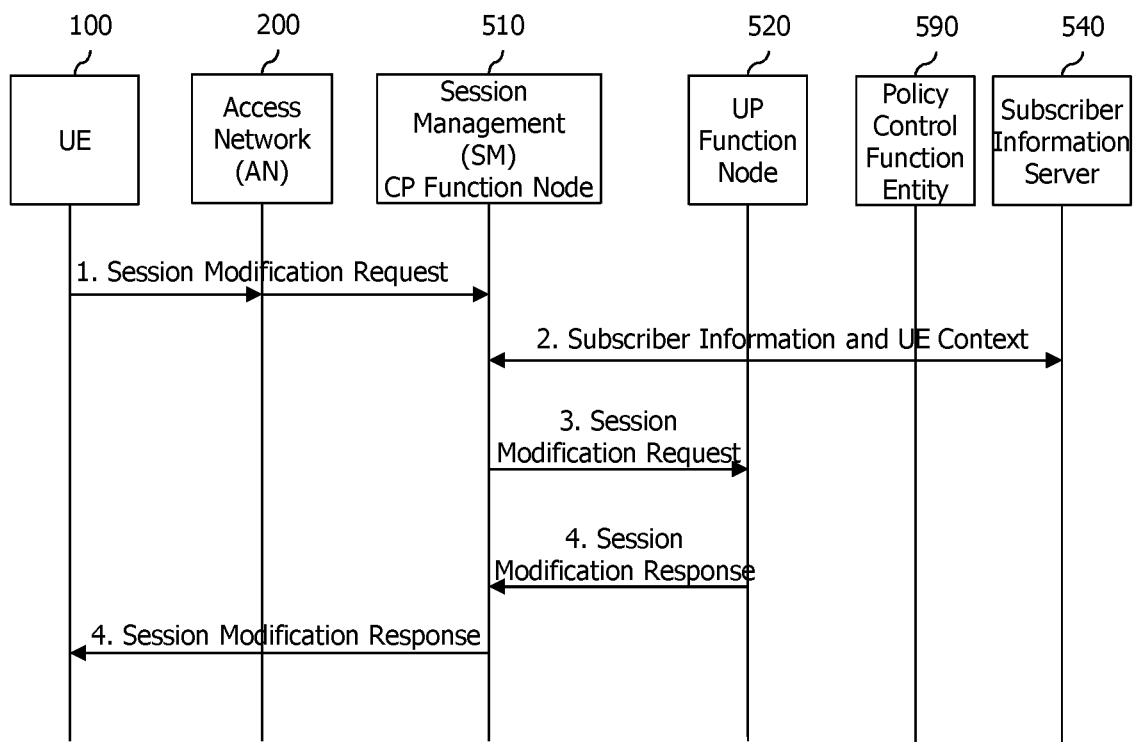
FIG. 9 illustrates a procedure for modifying a session.

FIG. 9 illustrates a procedure for modifying a session.

The UE 100 may perform the session modification procedure in the following cases.

A case in which configuration for an always-on or always-connected session needs to be modified (which may be triggered on the basis of the information provided from the network)

A case in which degree of continuity of a session needs to be modified

A network node and a CP function node for session management (SM) may perform the session modification procedure in the following cases.

A case in which configuration for an always-on or always-connected session needs to be changed (which may be triggered due to change of subscriber information)

A case in which re-allocation of the user plane is needed. For example, a case in which the CP function node for session management (SM) determines to change the UP function node responsible for the session for the purpose of load balancing or efficient path configuration of the user plane.

FIG. 9 illustrates a case in which the UE 100 initiates the session modification procedure.

More specifically, the UE 100 transmits a session modification request message to the CP function node 510 for session management (SM).

Then the CP function node 510 for session management (SM) obtains subscriber information and context of the UE from the subscriber information server 540. And the CP function node 510 for session management (SM) obtains policy information of a service provider from the policy control function (PCF). The CP function node 510 for session management (SM) checks the subscriber information on the basis of the session modification request from the UE.

The CP function node 510 for session management (SM) transmits a session modification request message to the UP function node and receives a session modification response message.

Then the CP function node 510 for session management (SM) transmits the session modification response message to the UE.

Figure 10:
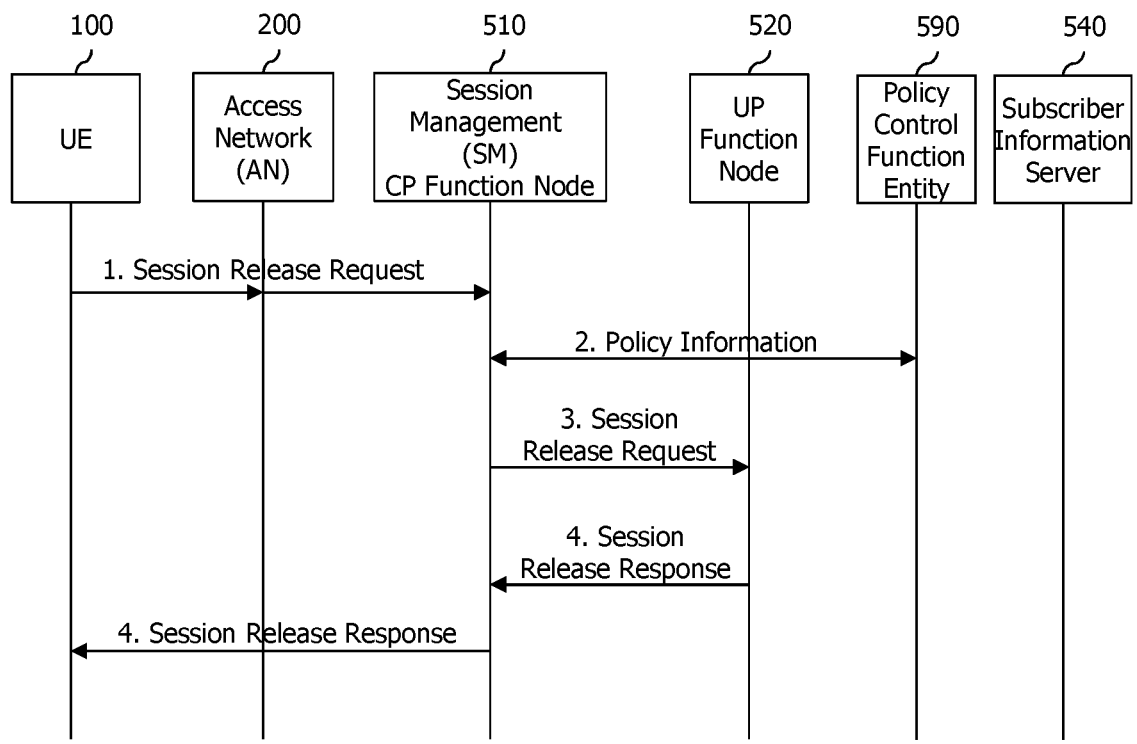
FIG. 10 illustrates a procedure for releasing a session.

FIG. 10 illustrates a procedure for releasing a session.

The UE may request release of a session in the following cases.

A case in which the UE is attached to the network and has one session for one data network (DN).

A case in which the UE is attached to the network and has multiple sessions.

A network node and a CP function node for session management (SM) may request release of a session in the following cases.

A case in which the UE requests detachment from the network or requests release of a specific session.

A case in which the policy of a service provider for the session is changed.

A case in which detachment is requested due to change of subscriber information

Meanwhile, if the session is configured to be always-on or always-connected, the session may not be detached unless detachment is performed.

FIG. 10 illustrates a case in which the UE 100 initiates the session release procedure.

More specifically, the UE 100 transmits a session release request message to the CP function node 510 for session management (SM).

Then the CP function node 510 for session management (SM) obtains subscriber information and context of the UE form the subscriber information server 540. And the CP function node 510 for session management (SM) obtains policy information of a service provider from the policy control function (PCF). The CP function node 510 for session management (SM) checks the subscriber information on the basis of the session release request from the UE.

The CP function node 510 for session management (SM) transmits a session release request message to the UP function node and receives a session release response message.

Then the CP function node 510 for session management (SM) transmits the session release response message to the UE.

II. Second Disclosure of the Present Specification

Meanwhile, the second disclosure of the present specification describes in detail the specific process of a UE's requesting creation of a session which needs to be always-on or always-connected and releasing the session.

Figure 11:
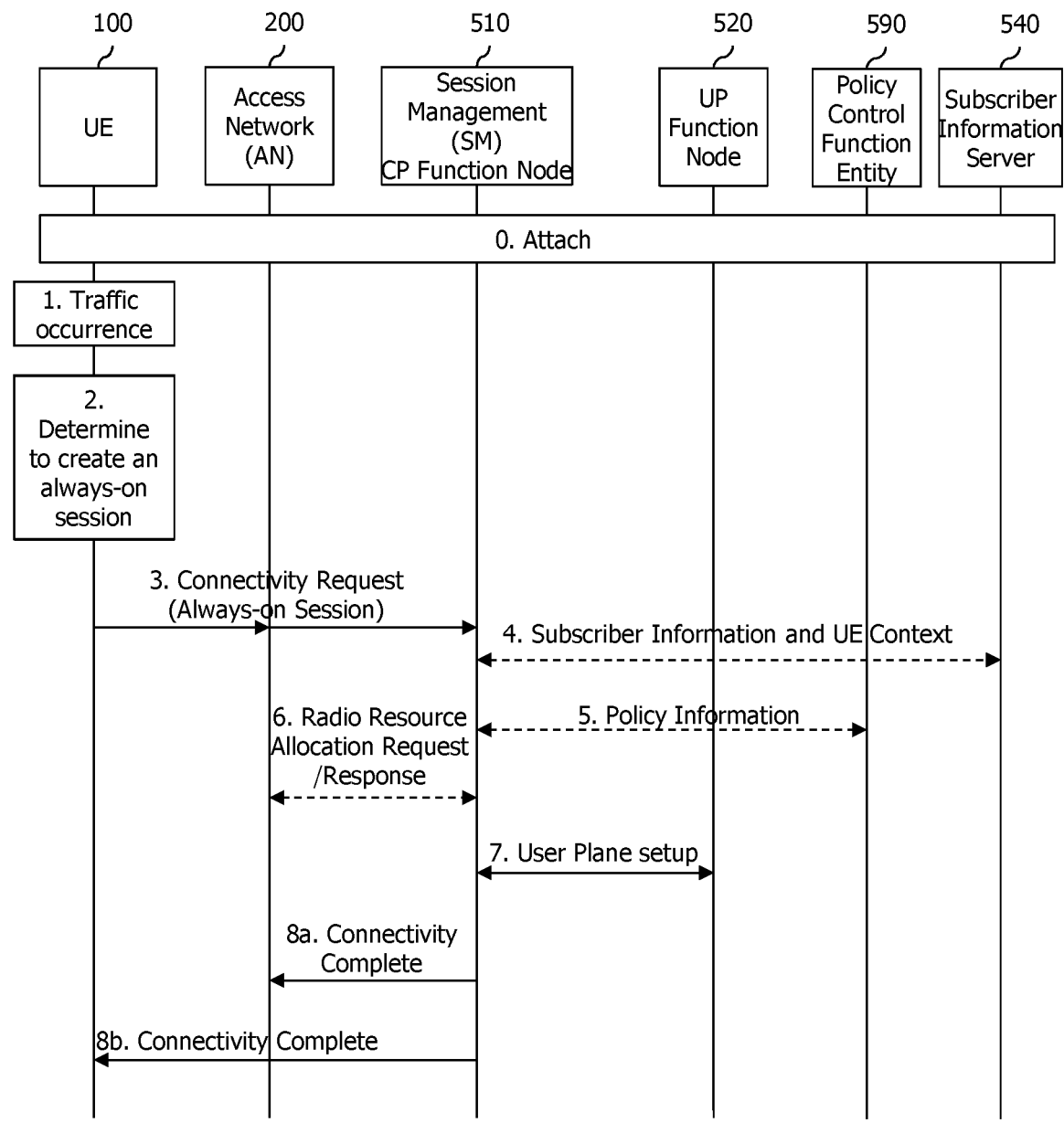
FIG. 11 illustrates a process of a UE's creating a session which needs to be always-on or always-connected.

FIG. 11 illustrates a process of a UE's creating a session which needs to be always-on or always-connected.

0) First, the UE 100 is attached to the next-generation network (so-called fifth generation network). At this time, it is assumed that the connectivity request procedure for creation of the session is not performed during the attach procedure. If the connectivity request procedure for creation of a session is not performed, the CP function node for session management (SM) within the core network does not participate in the attach procedure. Instead, a CP function node for registration and mobility management (MM) participates in the attach procedure.

1) Data traffic for a specific service is generated in the application layer of the UE 100.

2) Then the session management (SM) layer (namely NAS layer) within the UE 100 determines that a session has to be newly configured. And the session management (SM) layer (namely NAS layer) determines whether the corresponding session needs to be always-on or always-connected on the basis of application type, UE type, preconfigured information, and policy information of a service provider. For example, if the UE is an IoT device (for example, a metering machine or sensor), there is no need to create an always-on or always-connected session whereas, if the UE is a health-related/medical device, it is necessary to create a session which needs to be always-on or always-connected to transmit diagnostic data at any time.

3) Next, the session management (SM) layer transmits a connectivity request message to the CP function node 510 for session management (SM) through the access network (AN). At this time, the connectivity request message may include session type information indicating whether the UE request an IP session or a non-IP session. Also, the connectivity request message may include information indicating whether an always-on or always-connected session is needed. Similarly, the connectivity request message may include service type information.

4) In the absence of subscriber information and context of the corresponding UE, the CP function node 510 for session management (SM) performs interaction with the subscriber information server 540 and obtains the subscriber information and context of the corresponding UE.

5) The CP function node 510 for session management (SM) may perform interaction with the policy control function (PCF) entity 590 and obtain policy information of a service provider for session management of the corresponding UE.

6) The CP function node 510 for session management (SM) requests allocation of radio resources from the access network (AN)

7) And the CP function node 510 for session management (SM) selects an appropriate UP function node to deal with the session and lets the corresponding UP function node set up the user plane. At this time, if the session type indicates the IP session, the CP function node for session management (SM) may directly allocate an IP address to the UE or request the selected UP function node to allocate an IP address.

8) The CP function node 510 for session management (SM) transmits a connectivity complete message to the UE and the access network (AN). At this time, if the session type requested by the UE is the IP session, the connectivity complete message includes an IP address.

Figure 12:
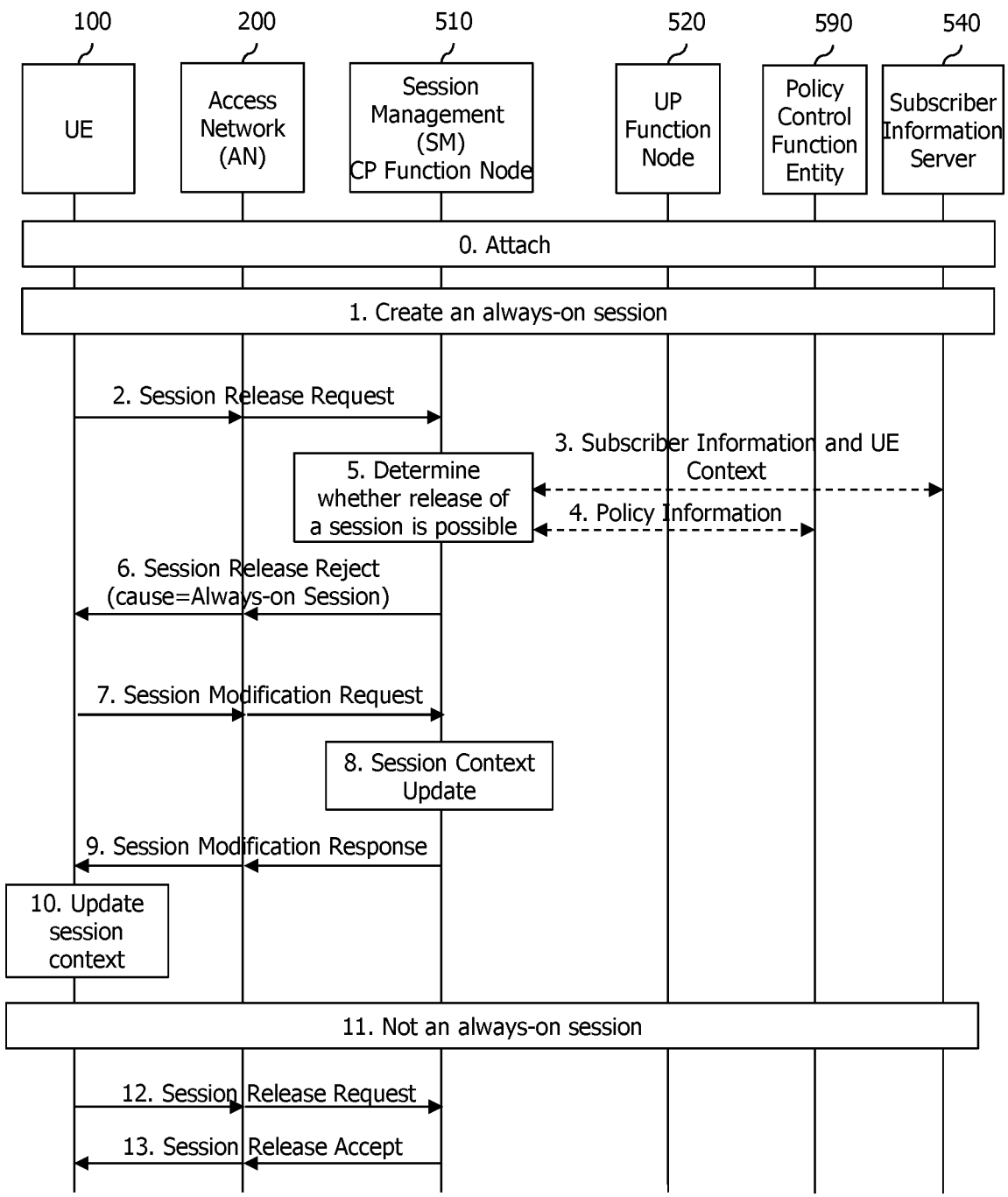
FIG. 12 illustrates a process of a UE's requesting release of the corresponding session according to a first embodiment of a second disclosure of the present specification.

FIG. 12 illustrates a process of a UE's requesting release of the corresponding session according to a first embodiment of a second disclosure of the present specification.

0) First, the UE 100 is attached to the next-generation network (so-called fifth generation network). At this time, it is assumed that the connectivity request procedure for creation of a session is not performed during the attach procedure.

1) As shown in FIG. 11, the UE 100 requests an always-on or always-connected session and completes creation of a session. The CP function node 510 for session management (SM) manages the created session as one which needs to be always-on or always-connected.

2) Meanwhile, hoping to release the session, the UE 100 transmits a session release request message to the CP function node 510 for session management (SM). For example, at a particular time point or when the corresponding service is completed, the UE 100 determines that maintaining the corresponding session is no longer needed and transmits a session release request message.

3-5) The CP function node 510 for session management (SM) determines whether to accept the session release request that the UE 100 has requested. The CP function node 510 for session management (SM) obtains information required to make a decision from the subscriber information server 540 or policy control function (PCF) entity.

6) The CP function node 510 for session management (SM) determines to reject the session release request from the UE since the session requested to be released is currently managed as one which needs to be always-on or always-connected and transmits a session release reject message to the UE. The session release reject message may include rejection cause information indicating that the session is managed as one which needs to be always-on or always-connected.

Alternatively, the CP function node 510 for session management (SM) may interpret the session release request from the UE 100 as requesting that the created session needs not be always-on or always-connected depending on the policy of a service provider, determine to accept the session release request, and transmit a session release accept message by performing the procedure 13 in the figure.

7) If receiving the session release reject message, the UE 100 checks the rejection cause information. If the UE 100 determines that the always-on or always-connected session has to be released at all, the UE 100 transmits a session modification request message. The session modification message includes information for changing attributes of the session.

8) The CP function node 510 for session management (SM) updates the attribute information in the session context for a session of the corresponding UE 100.

9) The CP function node 510 for session management (SM) informs of successful change of session attributes by transmitting a session modification response message to the UE 100.

10) The UE 100 updates the attribute information in the session context for the session.

11) From the operation above, the session is no longer managed as one which needs to be always-on or always-connected.

12-13) Then the UE 100 again transmits a session release request message and receives a session release response message in response to the request message.

Figure 13:
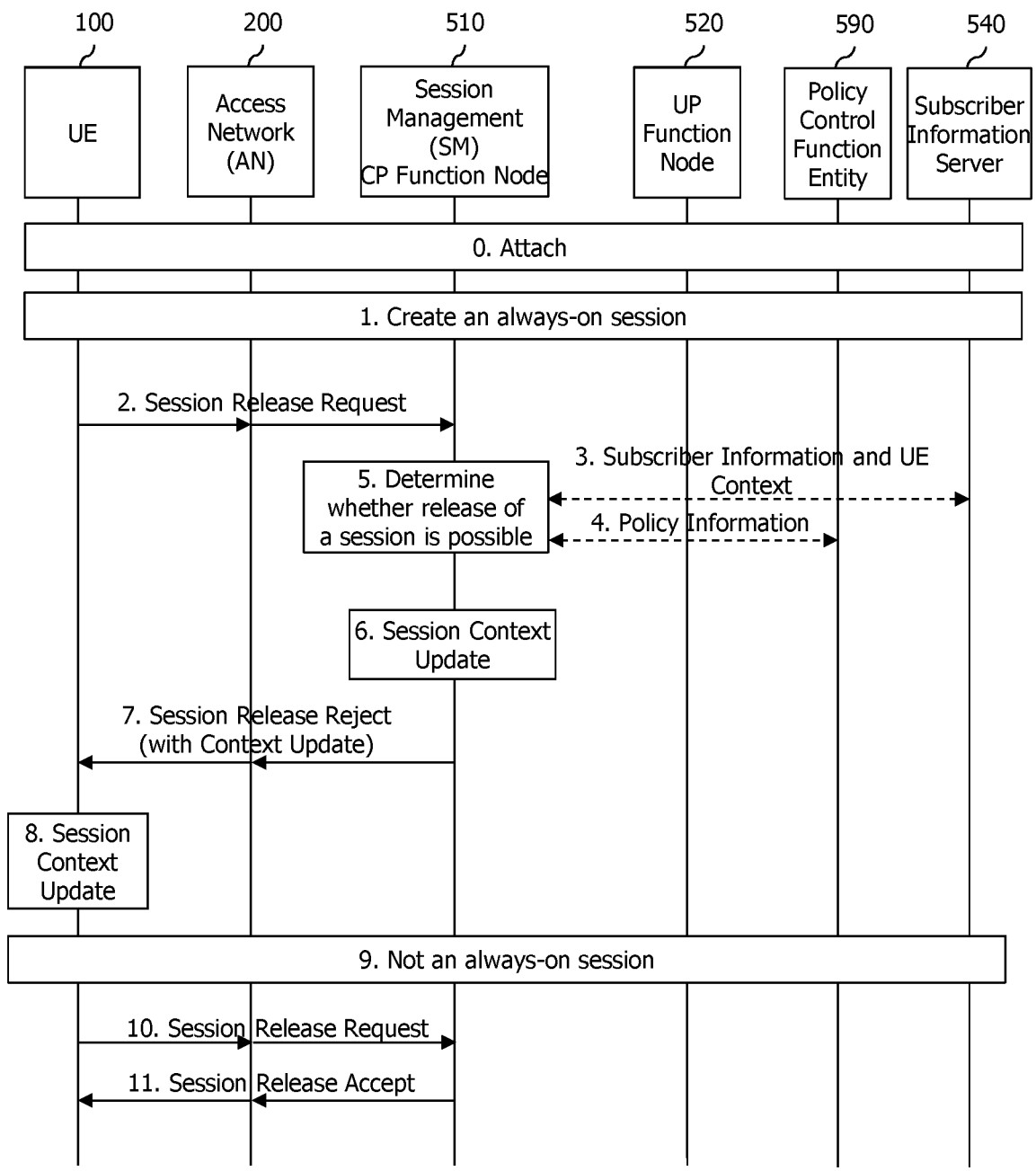
FIG. 13 illustrates a process of a UE's requesting release of the corresponding session according to a second embodiment of a second disclosure of the present specification.

FIG. 13 illustrates a process of a UE's requesting release of the corresponding session according to a second embodiment of a second disclosure of the present specification.

0-2) Since the steps are the same as the 0 to 2 steps of FIG. 12, descriptions thereof are not repeated but descriptions given with reference to FIG. 12 will be applied.

3-5) The CP function node 510 for session management (SM) determines whether to accept release of a session requested by the UE 100. The CP function node 510 for session management (SM) obtain information needed to make a decision from the subscriber information server 540 or policy control function (PCF) entity.

6) The CP function node 510 for session management (SM) interprets the session release request from the UE 100 as requesting that the created session needs not be always-on or always-connected depending on the policy of a service provider and updates the attribute in the session context for a session.

7) And the CP function node 510 for session management (SM) transmits a session release reject message to the UE 100. The session release reject message may include rejection cause information for requesting the UE to change the attributes within the session context since the session is managed as one which needs to be always-on or always-connected.

8) If receiving the session release reject message, the UE 100 checks the rejection cause information. The UE 100 updates attribute information in the session context for a session according to the rejection cause information.

9) From the operation above, the session is no longer managed as one which needs to be always-on or always-connected.

10-11) Then the UE 100 again transmits a session release request message and receives a session release response message in response to the request message.

Figure 14:
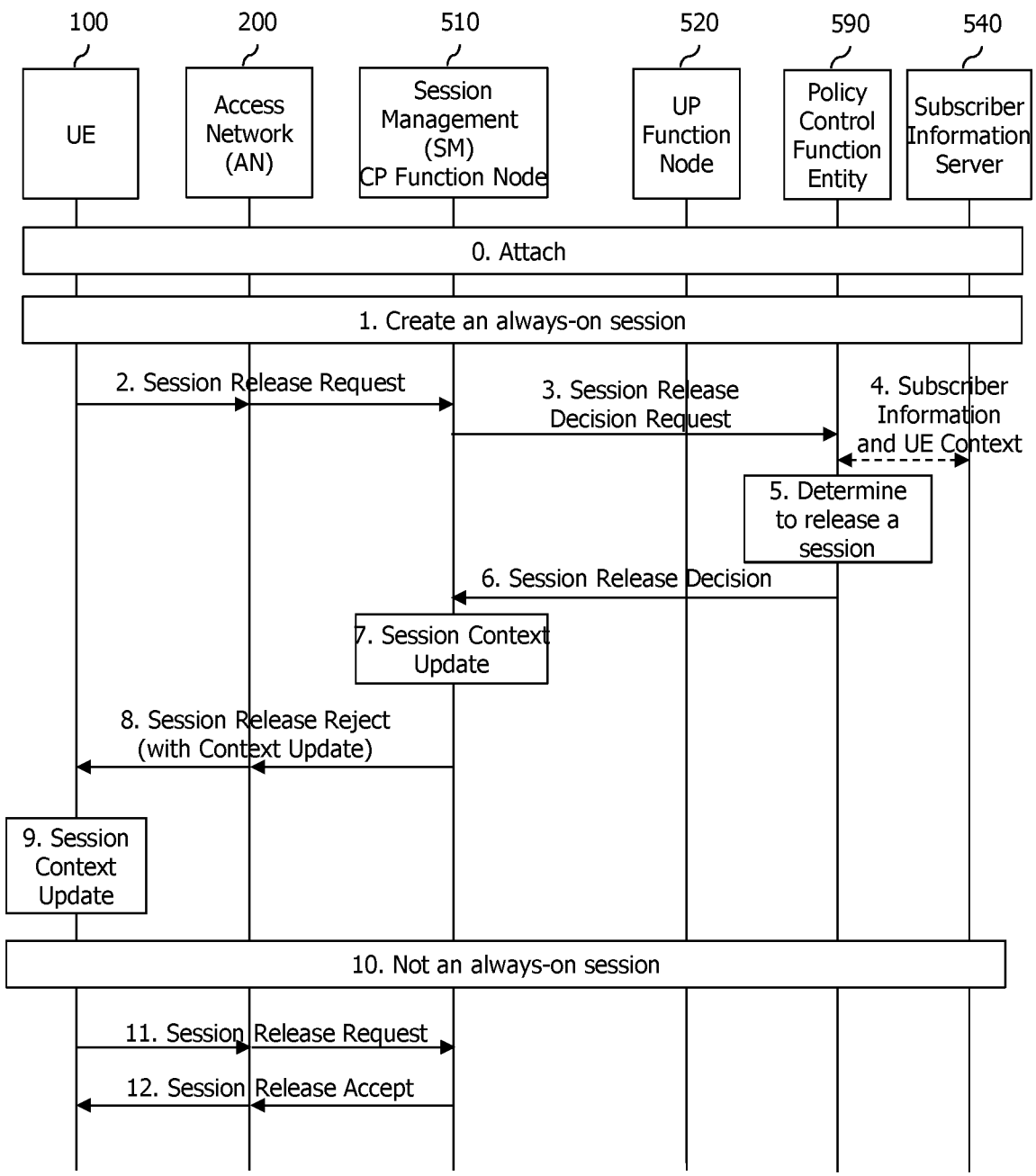
FIG. 14 illustrates a process of a UE's requesting release of the corresponding session according to a third embodiment of a second disclosure of the present specification.

FIG. 14 illustrates a process of a UE's requesting release of the corresponding session according to a third embodiment of a second disclosure of the present specification.

0-2) Since the steps are the same as the 0 to 2 steps of FIG. 12, descriptions thereof are not repeated but descriptions given with reference to FIG. 12 will be applied.

3-5) The CP function node 510 for session management (SM) transmits a session release decision request message to another node of the core network, namely policy control function (PCF) entity 590. In the embodiment of FIG. 14, it is assumed that the CP function node 510 for session management (SM) is capable of releasing only ordinary sessions and release of an always-on or always-connected session is determined by another node of the core network, namely policy control function (PCF) entity.

4-6) Another node of the core network, namely policy control function (PCF) entity 590 obtains subscriber information and context of the UE from the subscriber information server 540. Also, the PCF entity 590 may request/obtain additional information form a $3^{rd}$ party server. Afterwards, release of a session is determined on the basis of the information obtained. And a message informing of determination of release of a session is transmitted.

7) If receiving the message, the CP function node 510 for session management (SM) updates attribute information in the session context.

8) And the CP function node 510 for session management (SM) transmits a session release reject message to the UE. The session release reject message may include rejection cause information for requesting the UE to change the attributes within the session context since the session is managed as one which needs to be always-on or always-connected.

9) If receiving the session release reject message, the UE 100 checks the rejection cause information. According to the rejection cause information, the UE 100 updates attribute information in the session context for a session.

10) From the operation above, the session is no longer managed as one which needs to be always-on or always-connected.

11-12) Then the UE 100 again transmits a session release request message and receives a session release response message in response to the request message.

Figure 15A:
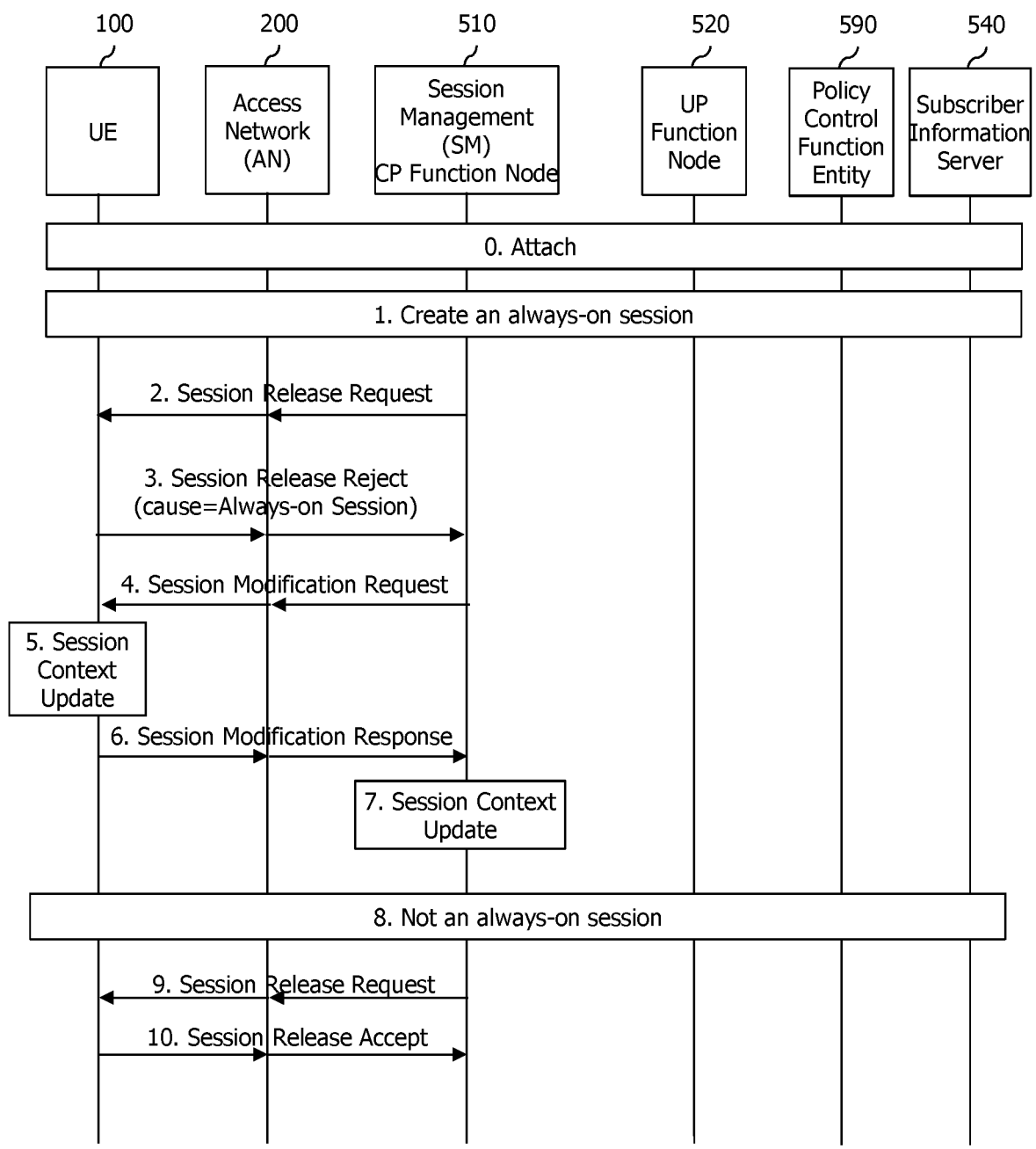
FIG. 15a illustrates a process of a UE's requesting release of the corresponding session according to a fourth embodiment of a second disclosure of the present specification.

FIG. 15*a* illustrates a process of a UE's requesting release of the corresponding session according to a fourth embodiment of a second disclosure of the present specification.

0-1) Since the steps are the same as the 0 to 1 steps of FIG. 12, descriptions thereof are not repeated but descriptions given with reference to FIG. 12 will be applied.

2) The CP function node 510 for session management (SM) transmits a session release request message to the UE 100. For example, at a particular time point or when the corresponding service is completed, the CP function node 510 for session management (SM) determines that maintaining the corresponding session is no longer needed due to change of subscriber information and policy of a service provider; and transmits a session release request message.

3) The UE 100 determines to reject the session release request from the network since the session requested to be released is currently managed as one which needs to be always-on or always-connected and transmits a session release reject message to the CP function node 510 for session management (SM). The session release reject message may include rejection cause information indicating that the session is managed as one which needs to be always-on or always-connected.

4) If receiving the session release reject message, the CP function node 510 for session management (SM) checks the rejection cause information. If the CP function node 510 for session management (SM) determines that the always-on or always-connected session has to be released at all, the CP function node 510 for session management (SM) transmits a session modification request message. The session modification message includes information for changing attributes of the session.

5) The UE 100 updates the attribute information in the session context for the corresponding session.

6) The UE 100 informs of successful change of session attributes by transmitting a session modification response message to the CP function node 510 for session management (SM).

7) The CP function node 510 for session management (SM) updates the attribute information in the session context for the session.

8) From the operation above, the session is no longer managed as one which needs to be always-on or always-connected.

9-10) Then the CP function node 510 for session management (SM) again transmits a session release request message and receives a session release response message in response to the request message.

Figure 15B:
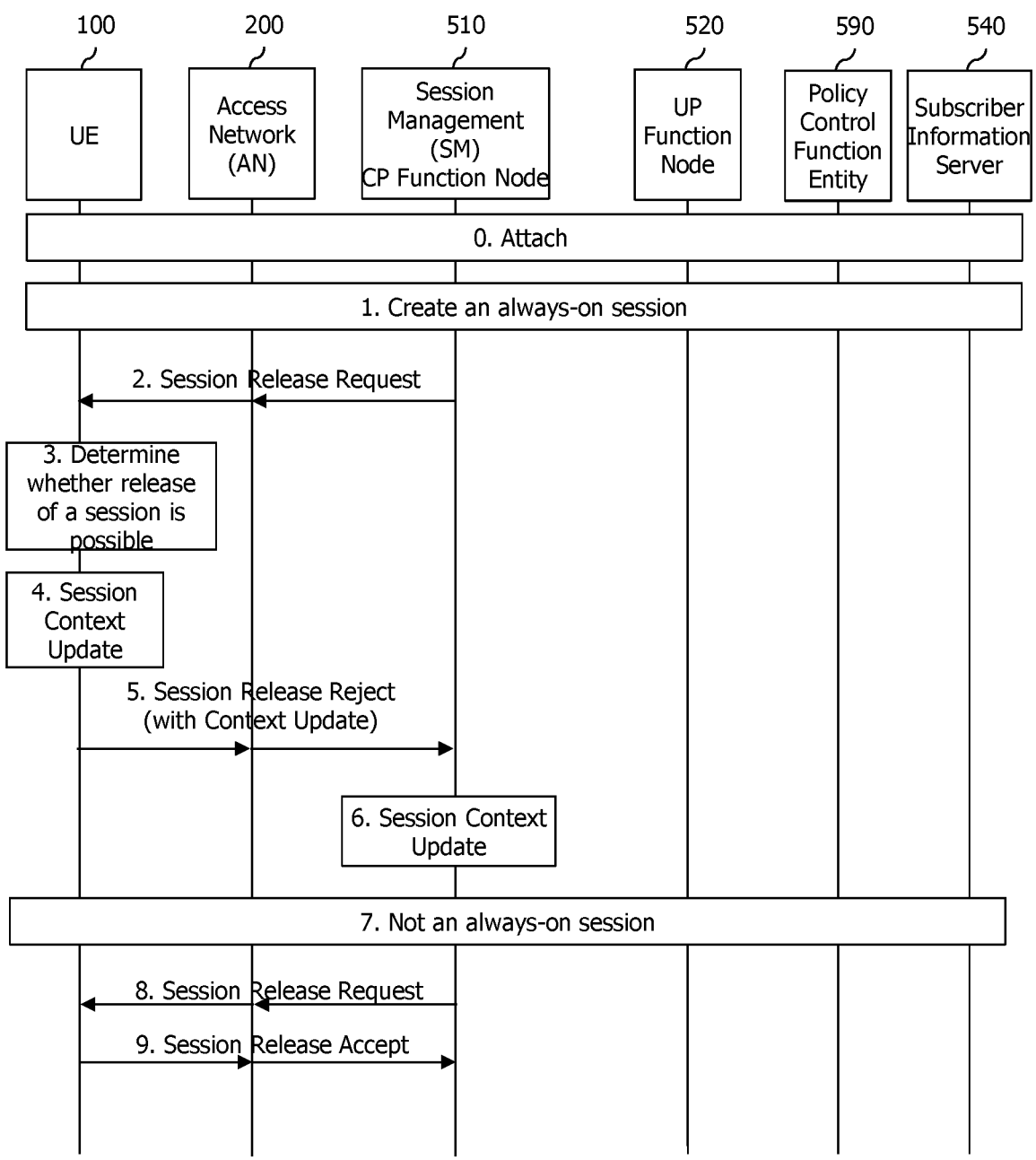
FIG. 15b illustrates a process of a UE's requesting release of the corresponding session according to a fifth embodiment of a second disclosure of the present specification.

FIG. 15*b* illustrates a process of a UE's requesting release of the corresponding session according to a fifth embodiment of a second disclosure of the present specification.

0-1) Since the steps are the same as the 0 to 1 steps of FIG. 12, descriptions thereof are not repeated but descriptions given with reference to FIG. 12 will be applied.

2) The CP function node 510 for session management (SM) transmits a session release request message to the UE 100. For example, at a particular time point or when the corresponding service is completed, the CP function node 510 for session management (SM) determines that maintaining the corresponding session is no longer needed due to change of subscriber information and policy of a service provider; and transmits a session release request message.

3) The UE determines whether to accept release of a session requested by the CP function node 510 for session management (SM). If it is determined that an application service for the corresponding session has been completed in the current application layer, the UE may accept release of the session.

4) The UE 100 interprets the session release request from the CP function node 510 for session management (SM) as requesting that the created session needs not be always-on or always-connected depending on the policy of a service provider and updates the attribute in the session context for the session.

5) And the UE 100 transmits a session release reject message to the CP function node 510 for session management (SM). The session release reject message may include rejection cause information for requesting the CP function node 510 for session management (SM) to change the attributes within the session context since the session is managed as one which needs to be always-on or always-connected.

6) The CP function node 510 for session management (SM) updates the attribute information in the session context for the session.

7) From the operation above, the session is no longer managed as one which needs to be always-on or always-connected.

8-9) Then the CP function node 510 for session management (SM) again transmits a session release request message and receives a session release response message in response to the request message.

II. Third Disclosure of the Present Specification

Meanwhile, the third disclosure of the present specification describes in detail the specific process of a network's requesting creation of a session which needs to be always-on or always-connected and releasing the session.

Figure 16:
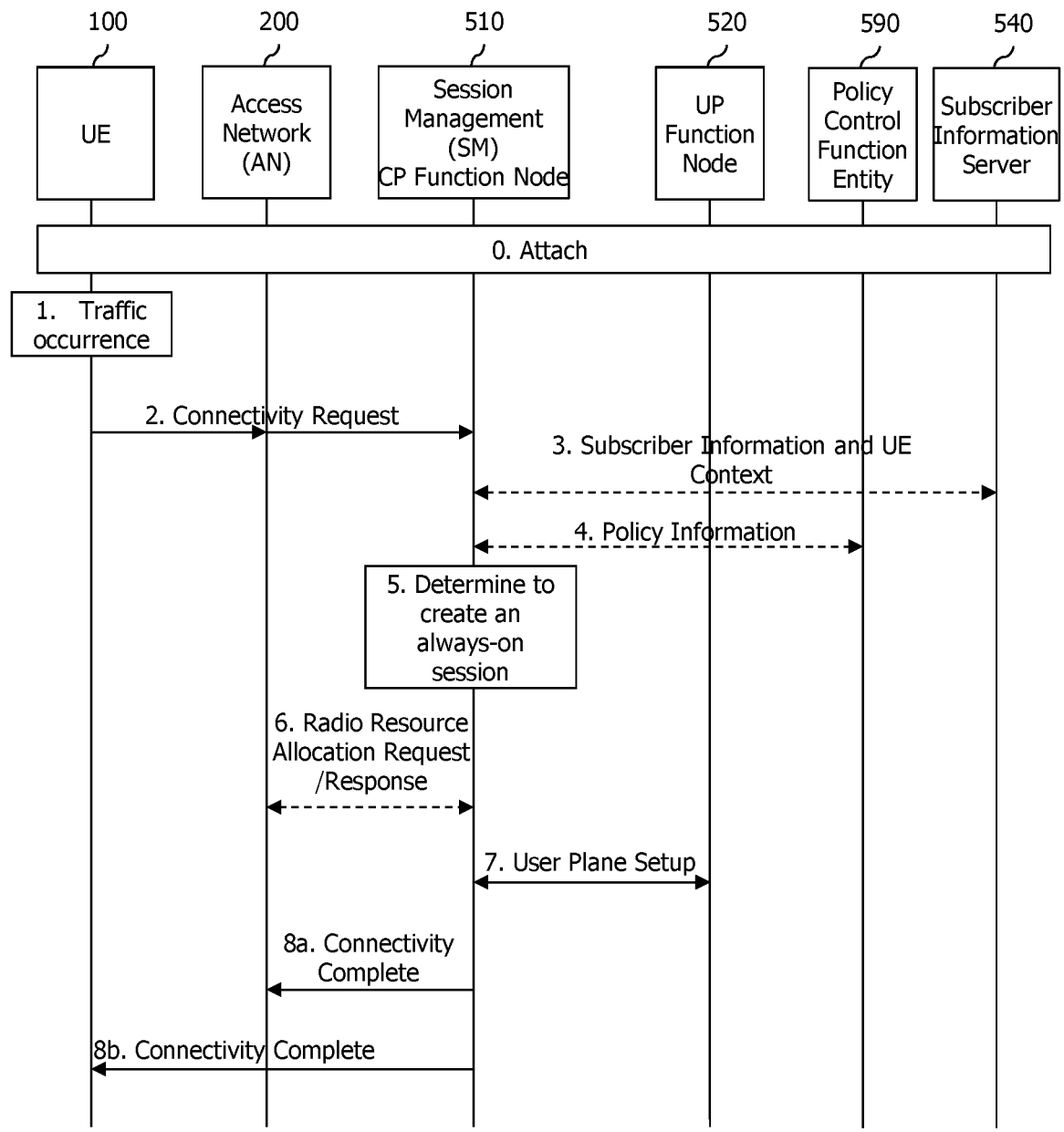
FIG. 16 illustrates a process for a network to create a session which needs to be always-on or always-connected according to a third disclosure of the present specification.

FIG. 16 illustrates a process for a network to create a session which needs to be always-on or always-connected according to a third disclosure of the present specification.

0) First, the UE 100 is attached to the next-generation network (so-called fifth generation network). At this time, it is assumed that the connectivity request procedure for creation of a session is not performed during the attach procedure. If the connectivity request procedure for creation of a session is not performed, the CP function node for session management (SM) within the core network does not participate in the attach procedure. Instead, a CP function node for registration and mobility management (MM) participates in the attach procedure.

1) Data traffic for a specific service is generated in the application layer of the UE 100.

2) Then the session management (SM) layer (namely NAS layer) within the UE 100 determines that a session has to be newly configured. Next, the session management (SM) layer transmits a connectivity request message to the CP function node 510 for session management (SM) through the access network (AN). At this time, the connectivity request message may include session type information which indicates whether the UE request an IP session or a non-IP session. Also, the connectivity request message may include type information of a service.

3) In the absence of subscriber information and context of the corresponding UE, the CP function node 510 for session management (SM) performs interaction with the subscriber information server 540 and obtains the subscriber information and context of the corresponding UE.

4) The CP function node 510 for session management (SM) may perform interaction with the policy control function (PCF) entity 590 and obtain policy information of a service provider for session management of the corresponding UE.

5) The CP function node 510 for session management (SM) determines that a session has to be newly configured. And the CP function node 510 for session management (SM) determines whether the corresponding session needs to be always-on or always-connected on the basis of one or more of the UE type, session type information within the service connectivity request message, information of a data network which provides the corresponding service, policy information of a service provider, subscriber information, and context of the UE.

6) The CP function node 510 for session management (SM) requests the access network (AN) to allocate radio resources.

7) And the CP function node 510 for session management (SM) selects an appropriate UP function node to deal with the session and lets the corresponding UP function node set up the user plane. At this time, if the session type indicates the IP session, the CP function node for session management (SM) may directly allocate an IP address to the UE or request the selected UP function node to allocate an IP address.

8) The CP function node 510 for session management (SM) transmits a connectivity complete message to the UE and the access network (AN). At this time, if the session type requested by the UE is the IP session, the connectivity complete message includes an IP address. Also, the connectivity complete message may include information indicating that the created session is an always-on or always-connected session.

Figure 17:
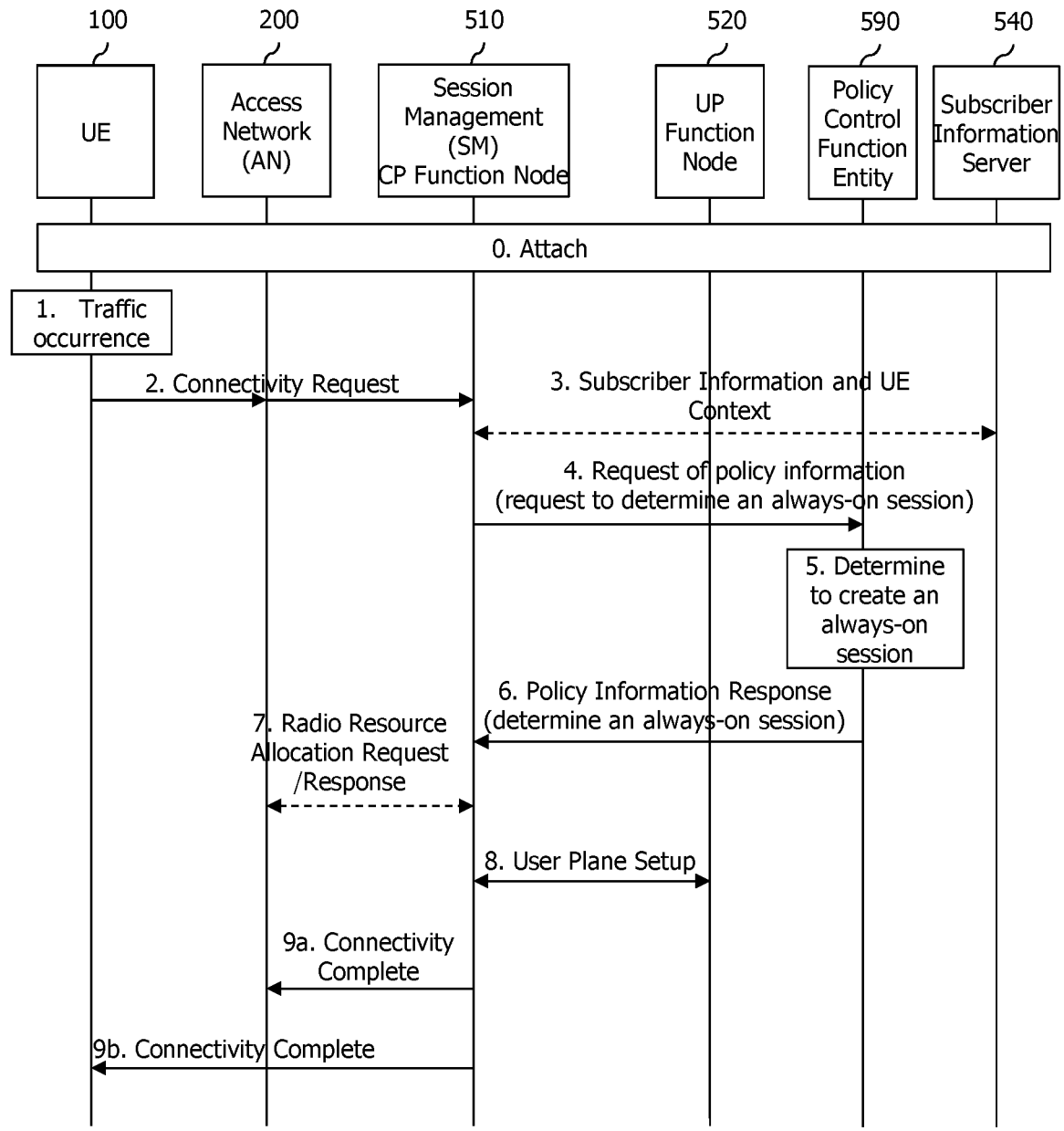
FIG. 17 illustrates a modified example of the process for creating a session of FIG. 16.

FIG. 17 illustrates a modified example of the process for creating a session of FIG. 16.

According to FIG. 17, whether the corresponding session needs to be always-on or always-connected is determined by another network node, for example, policy control function (PCF) entity.

0-3) Since the steps are the same as the 0 to 3 steps of FIG. 16, descriptions thereof are not repeated but descriptions given with reference to FIG. 16 will be applied.

4) The CP function node 510 for session management (SM) requests policy information for the policy control function (PCF) entity 590. At this time, a request may also be delivered to the PCF entity, which requests to determine whether to create a session needed to be always-on or always-connected for the UE. Also, information needed to make a decision for the request, for example, type information of a UE, session type information, service type information, subscriber information, and context information of the UE is transmitted together.

5) The policy control function (PCF) entity 590 determines whether the corresponding session needs to be always-on or always-connected on the basis of the delivered information and its own information (for example, policy information of a service provider). At this time, if not having received the information required to make a decision for the request, the policy control function (PCF) entity 590 may request and receive the information by itself.

6) While transmitting the policy of a service provider, the policy control function (PCF) entity 590 delivers a decision result about an always-on or always-connected session.

Then the CP function node 510 for session management (SM) updates session context on the basis of the decision result.

7-9) Since the steps are the same as the 6 to 8 steps of FIG. 16, descriptions thereof are not repeated but descriptions given with reference to FIG. 16 will be applied.

Figure 18:
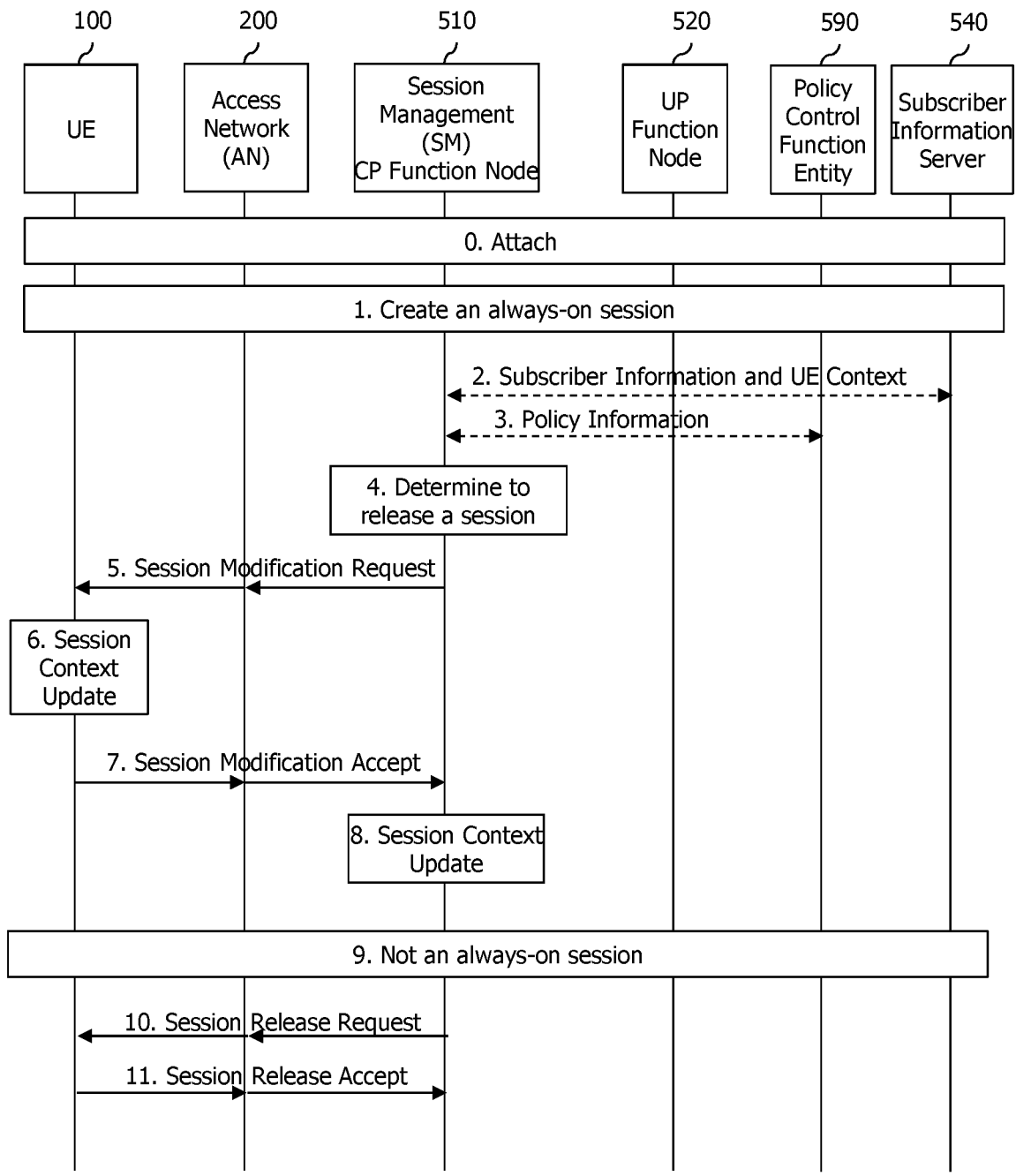
FIG. 18 illustrates a process for a network's requesting release of the corresponding session according to a first embodiment of the third disclosure of the present specification.

FIG. 18 illustrates a process for a network's requesting release of the corresponding session according to a first embodiment of the third disclosure of the present specification.

0) First, the UE 100 is attached to the next-generation network (so-called fifth generation network). At this time, it is assumed that the connectivity request procedure for creation of a session is not performed during the attach procedure.

1) As shown in FIG. 16 or 17, creation of a session which needs to be always-on or always-connected is completed.

2-3) If one or more of subscriber information, UE context information, and policy information are updated, the CP function node 510 for session management (SM) obtains the updated information through interaction.

4) The CP function node 510 for session management (SM) determines to release a session. For example, at a particular time point or when the corresponding service is completed (as a specific example, when the CP function node 510 for session management (SM) directly/indirectly recognizes that traffic is no longer transmitted or received for a predetermined time period through the corresponding session or that an end packet of a service is transmitted or received), the CP function node 510 for session management (SM) determines that the corresponding session is no longer needed to be maintained.

5) The CP function node 510 for session management (SM) transmits a session modification request to the UE 100 to modify the attributes of the session.

6-7) The UE 100 updates session attribute information within the context for the corresponding session and informs that session attributes have been modified successfully by transmitting a session modification accept message.

8) The CP function node 510 for session management (SM) also updates the session attribute information within the context for the corresponding session.

9) From the operation above, the session is no longer managed as one which needs to be always-on or always-connected.

10-11) Then the CP function node 510 for session management (SM) again transmits a session release request message and receives a session release response message in response to the request message.

Figure 19:
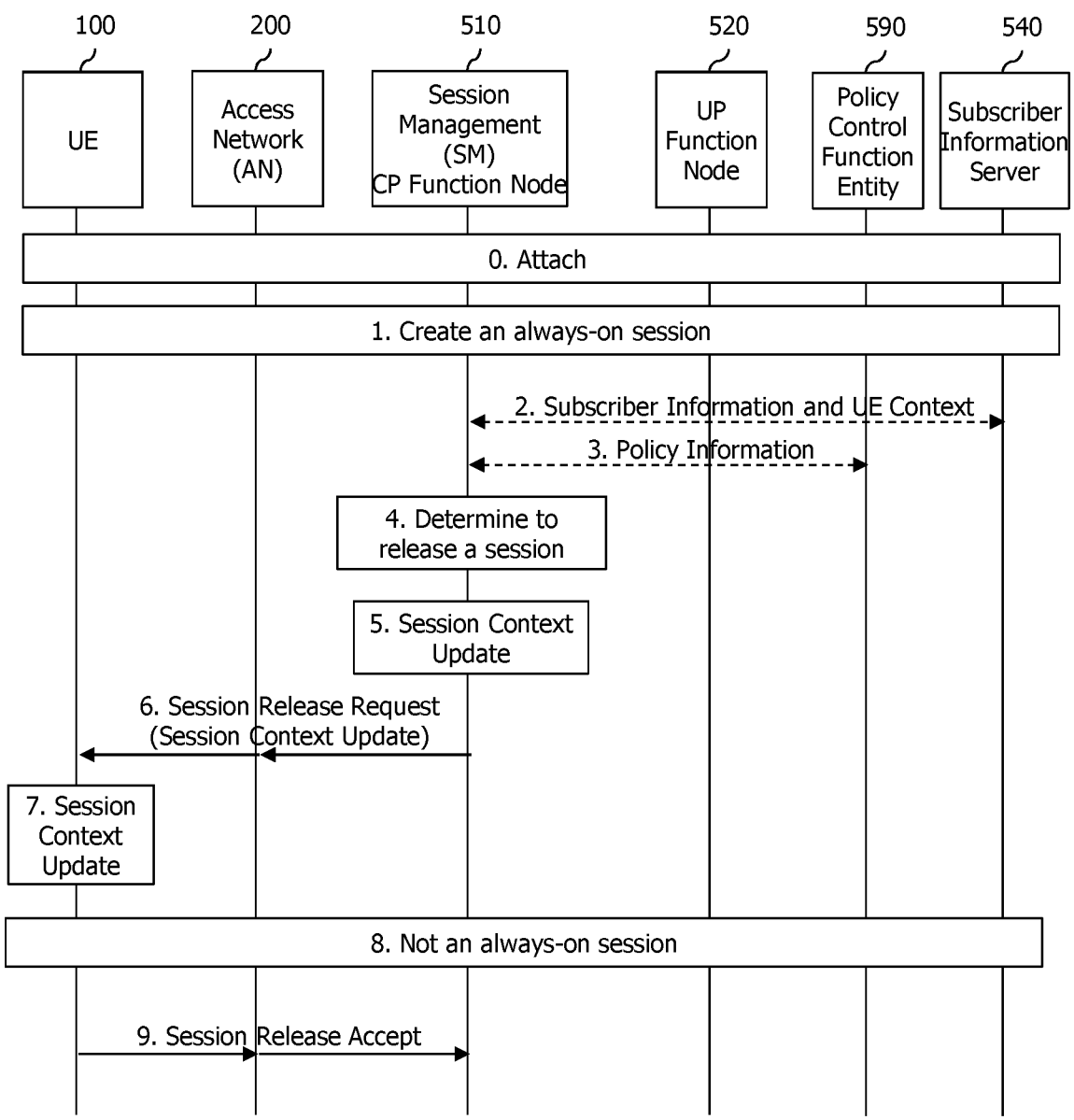
FIG. 19 illustrates a process for a network's requesting release of the corresponding session according to a second embodiment of the third disclosure of the present specification.

FIG. 19 illustrates a process for a network's requesting release of the corresponding session according to a second embodiment of the third disclosure of the present specification.

0-4) Since the steps are the same as the 0 to 4 steps of FIG. 18, descriptions thereof are not repeated but descriptions given with reference to FIG. 18 will be applied.

5) The CP function node 510 for session management (SM) updates the attribute information within the session context to change the corresponding session into one which needs not be always-on or always-connected. By modifying the attribute of the corresponding session instead of performing the session modification procedure, signaling between the UE 100 and the network may be minimized.

6) The CP function node 510 for session management (SM) transmits a session release request message. At this time, to change the corresponding session into one which needs not be always-on or always-connected, a request for updating the session context may be delivered together.

7) The UE 100 updates session attribute information within the context for the corresponding session.

8) From the operation above, the session is no longer managed as one which needs to be always-on or always-connected.

9) Next, the UE 100 transmits a session release accept message.

FIG. 20 illustrates a process for a network's requesting release of the corresponding session according to a third embodiment of the third disclosure of the present specification.

0-1) Since the steps are the same as the 0 to 1 steps of FIG. 18, descriptions thereof are not repeated but descriptions given with reference to FIG. 18 will be applied.

2) The CP function node 510 for session management (SM) transmits a session release decision request message to another node of the core network, namely policy control function (PCF) entity 590. In the embodiment of FIG. 20, it is assumed that the CP function node 510 for session management (SM) is capable of releasing only ordinary sessions and release of an always-on or always-connected session is determined by another node of the core network, namely policy control function (PCF) entity.

3-5) Another node of the core network, namely policy control function (PCF) entity 590 obtains subscriber information and context of the UE from the subscriber information server 540. Also, the PCF entity 590 may request/obtain additional information form a $3^{rd}$ party server. Afterwards, release of a session is determined on the basis of the information obtained. And a message informing of determination of release of a session is transmitted.

6) If receiving the message, the CP function node 510 for session management (SM) updates attribute information in the session context.

7) The CP function node 510 for session management (SM) transmits a session release request message. At this time, to change the corresponding session to one which needs not be always-on or always-connected, a request for updating the session context may be delivered together.

8-10) Since the steps are the same as the 7 to 9 steps of FIG. 19, descriptions thereof are not repeated but descriptions given with reference to FIG. 19 will be applied.

On the other hand, although not shown in the figure, as another embodiment, if the CP function node 510 for session management (SM) delivers a session release request message to the UE due to malfunction of the network, the UE 100 may initiate the session modification procedure to update the context including the attributes of the corresponding session after transmitting a session release reject message.

Figure 21A:
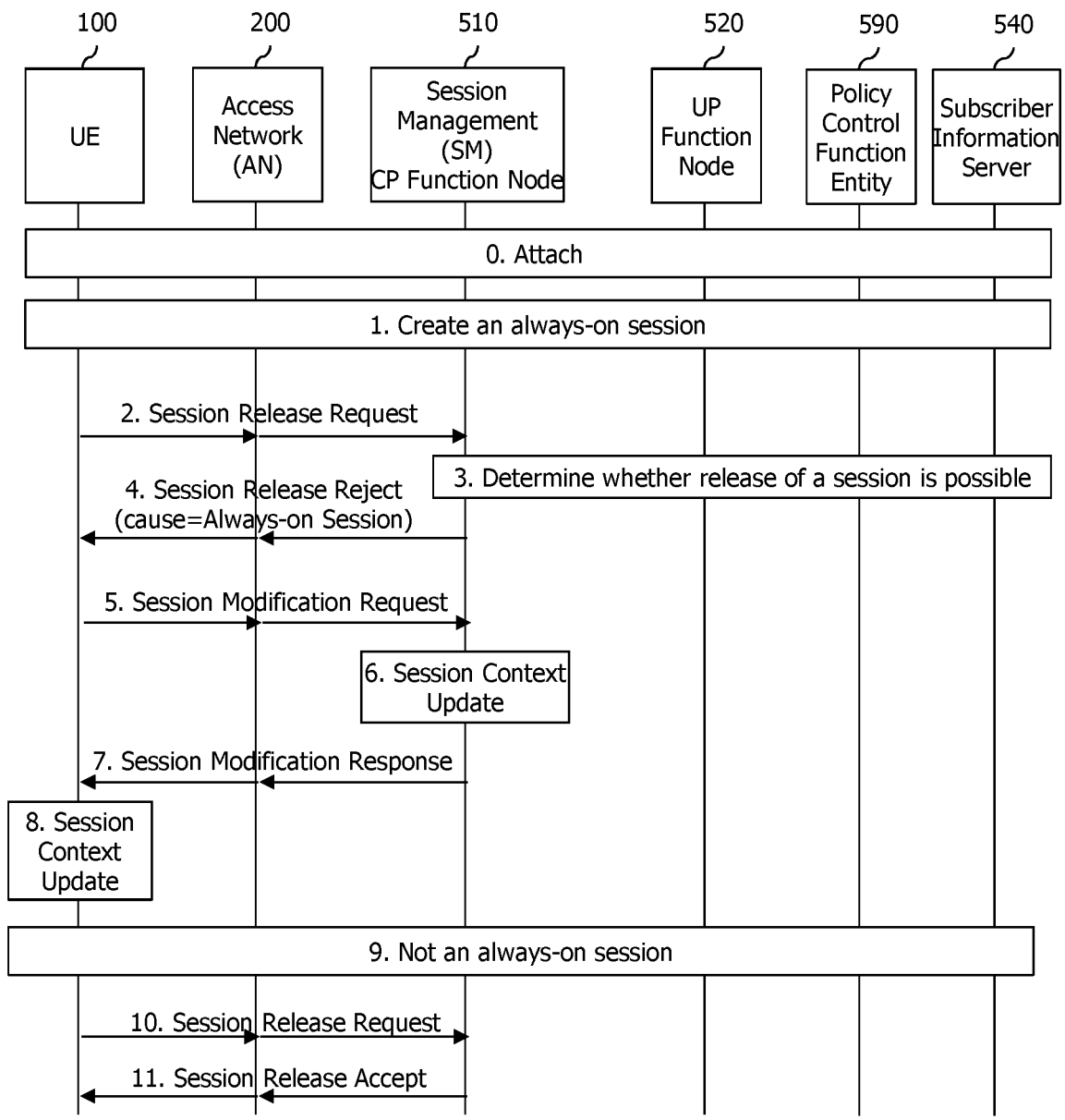
FIG. 21a illustrates a process for a UE's requesting release of the corresponding session according to a fourth embodiment of the third disclosure of the present specification.

FIG. 21a illustrates a process for a UE's requesting release of the corresponding session according to a fourth embodiment of the third disclosure of the present specification.

0-1) Since the steps are the same as the 0 to 1 steps of FIG. 18, descriptions thereof are not repeated but descriptions given with reference to FIG. 18 will be applied.

2) Hoping to release the session, the UE 100 transmits a session release request message to the CP function node 510 for session management (SM). For example, at a particular time point or when the corresponding service is completed, the UE 100 determines that maintaining the corresponding session is no longer needed and transmits a session release request message.

3) The CP function node 510 for session management (SM) or a third network node determines whether to accept the session release request that the UE 100 has requested. The CP function node 510 for session management (SM) may obtain information required to make a decision from the subscriber information server 540 or policy control function (PCF) entity, request the third network node to make a decision about session release, and receive a decision result. The UP function node 520 does not participate in the session release decision procedure.

4) The CP function node 510 for session management (SM) determines to reject the session release request from the UE since the session requested to be released is currently managed as one which needs to be always-on or always-connected and transmits a session release reject message to the UE. The session release reject message may include rejection cause information indicating that the session is managed as one which needs to be always-on or always-connected.

Alternatively, the CP function node 510 for session management (SM) may interpret the session release request from the UE 100 as requesting that the created session needs not be always-on or always-connected depending on the policy of a service provider, determine to accept the session release request, and transmit a session release accept message by performing the procedure 11 in the figure.

5) If receiving the session release reject message, the UE 100 checks the rejection cause information. If the UE 100 determines that the always-on or always-connected session has to be released at all, the UE 100 transmits a session modification request message. The session modification message includes information for changing attributes of the session.

6) The CP function node 510 for session management (SM) updates the attribute information in the session context for a session of the corresponding UE 100.

7) The CP function node 510 for session management (SM) informs of successful change of session attributes by transmitting a session modification response message to the UE 100.

8) The UE 100 updates the attribute information in the session context for the session.

9) From the operation above, the session is no longer managed as one which needs to be always-on or always-connected.

10-11) Then the UE 100 again transmits a session release request message and receives a session release response message in response to the request message.

Figure 21B:
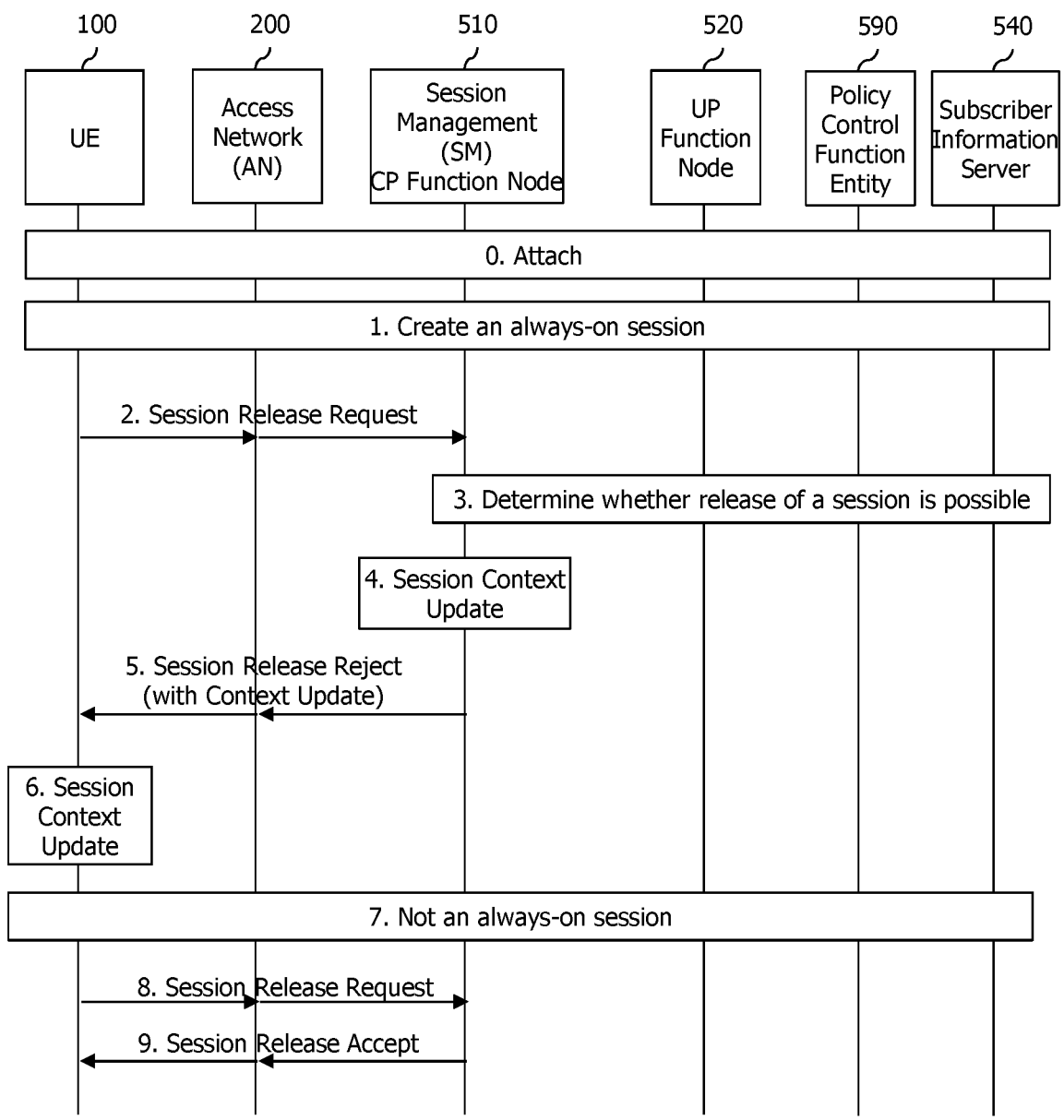
FIG. 21b illustrates a process for a UE's requesting release of the corresponding session according to a fifth embodiment of the third disclosure of the present specification.

FIG. 21b illustrates a process for a UE's requesting release of the corresponding session according to a fifth embodiment of the third disclosure of the present specification.

0-1) Since the steps are the same as the 0 to 1 steps of FIG. 18, descriptions thereof are not repeated but descriptions given with reference to FIG. 18 will be applied.

2) Hoping to release the session, the UE 100 transmits a session release request message to the CP function node 510 for session management (SM). For example, at a particular time point or when the corresponding service is completed, the UE 100 determines that maintaining the corresponding session is no longer needed and transmits a session release request message.

3) The CP function node 510 for session management (SM) or a third network node determines whether to accept the session release request that the UE 100 has requested. The CP function node 510 for session management (SM) may obtain information required to make a decision from the subscriber information server 540 or policy control function (PCF) entity, request the third network node to make a decision about session release, and receive a decision result. The UP function node 520 does not participate in the session release decision procedure.

4) The CP function node 510 for session management (SM) interprets the session release request from the UE 100 as requesting that the created session needs not be always-on or always-connected depending on the policy of a service provider and updates the attribute in the session context for a session.

5) And the CP function node 510 for session management (SM) transmits a session release reject message to the UE 100. The session release reject message may include rejection cause information for requesting the UE to change the attributes within the session context since the session is managed as one which needs to be always-on or always-connected.

6) If receiving the session release reject message, the UE 100 checks the rejection cause information. The UE 100 updates attribute information in the session context for a session according to the rejection cause information.

7) From the operation above, the session is no longer managed as one which needs to be always-on or always-connected.

8-9) Then the UE 100 again transmits a session release request message and receives a session release response message in response to the request message.

What has been described so far may be implemented in hardware. Hardware implementation will be described with reference to FIG. 22.

Figure 22:
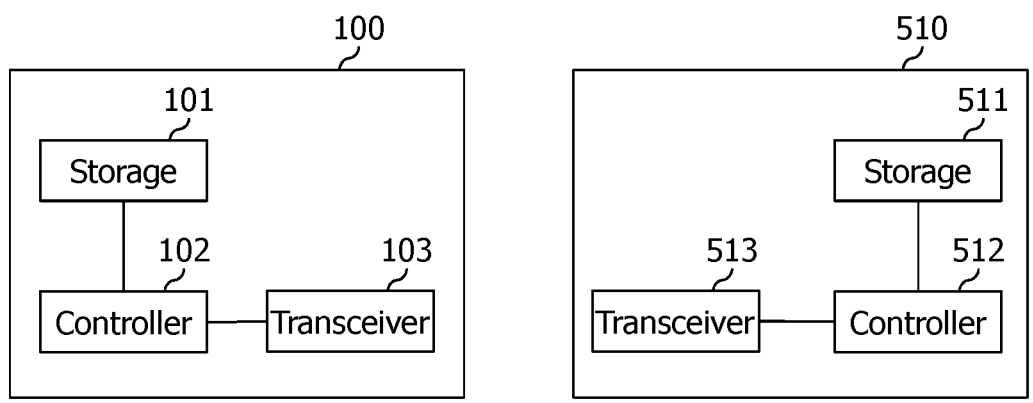
FIG. 22 illustrates a structural block diagram of a UE 100 and a network node according to an embodiment of the present invention.

FIG. 22 illustrates a structural block diagram of a UE 100 and a network node according to an embodiment of the present invention.

As shown in FIG. 22, the UE 100 includes a storage means 101, controller 102, and transmission and reception unit 103. And the network node may be the CP function node 510 for session management (SM). The network node includes a storage means 511, controller 512, and transmission and reception unit 513.

The storage means store the methods described above.

The controllers control the storage means and the transmission and reception units. More specifically, the controllers execute the methods stored in the storage means. And the controllers transmit the aforementioned signals through the transmission and reception units.

In this document, preferred embodiments of the present invention have been described, but the technical scope of the present invention is not limited only to the specific embodiments. Therefore, the present invention may be modified, changed, or updated in various ways within the technical principles and scope defined by the appended claims.

What is claimed is:

1. A method for creating a session by a control plane (CP) function entity responsible for session management in a next generation mobile communication network, the method comprising:
   based on that session creation is not performed while a user equipment (UE) is attached to a core network, receiving a connectivity request message, which includes type information of a service, from the UE;
   determining to create a session, which needs to be always-on or always-connected for the UE, based on the type information of the service;
   transmitting a connectivity complete message, which includes information informing that the session is created, to the UE;
   receiving a session release request message requesting release of the session from the UE; and
   transmitting a session release reject message to the UE,
   wherein the session release reject message includes cause information informing that the session needs to be always-on or always-connected for the UE, and
   wherein the cause information is used by the UE for transmitting a session modification request message when the UE determines that the session needs to be released.

2. The method of claim 1, wherein the determining is performed based on one or more of a type of the UE, preconfigured information, or policy information of a service provider.

3. The method of claim 1, wherein the determining comprises:
   transmitting a policy information request including a request for a decision to a policy control function (PCF) entity, wherein the decision regards whether to create the session, which needs to be always-on or always-connected for the UE; and
   receiving a policy information response including a decision result.

4. The method of claim 1, further comprising:
   determining to release the session, which needs to be always-on or always-connected; and
   updating session context to modify attribute of the session into that of a session which needs not be always-on or always-connected.

5. The method of claim 4, further comprising
   transmitting a session modification request message to the UE to request modification of the attribute of the session;
   receiving a session modification response message in response to the session modification request message; and
   transmitting a session release request message to the UE.

6. The method of claim 4, further comprising
   after updating the session context, transmitting a session release request message to the UE, wherein
   the session release request message includes a request requesting the UE to update session context to modify attribute of the session into that of a session which needs not be always-on or always-connected.

7. The method of claim 4, further comprising
   transmitting a request requesting to make a decision about whether to release the session, which needs to be always-on or always-connected, to a policy control function (PCF) entity; and
   receiving a decision result by the PCF entity.

8. The method of claim 1, further comprising:
   receiving the session modification request message from the UE to modify the session into one which needs not be always-on or always-connected;
   updating context of the session for modifying the session into one which needs not be always-on or always-connected; and
   transmitting a response message in response to a session modification request which induces session context update of the UE.

9. The method of claim 1, further comprising:
   updating context of the session for modifying the session into one which needs not be always-on or always-connected; and
   transmitting a session release reject message comprising a request requesting to change the session into one which needs not be always-on or always-connected to the UE.

10. The method of claim 1, wherein the session release reject message is transmitted to the UE, (i) based on that the session, which needs to be always-on or always-connected for the UE, is not released until the UE is detached from the core network, and (ii) based on that the UE is attached to the core network.

11. A control plane (CP) function entity for session management in a next generation mobile communication network, the CP function entity comprising:
    a transceiver;
    a processor controlling transceiver, wherein the processor is configured to:
    control the transceiver to receive a connectivity request message, which includes type information of a service, from a user equipment (UE), based on that session creation is not performed while the UE is attached to a core network;
    determine to create a session which needs to be always-on or always-connected for the UE, based on the type information of the service;
    control the transceiver to transmit a connectivity complete message, which includes information informing that the session is created, to the UE;

control the transceiver to receive a session release request message requesting release of the session from the UE; and control the transceiver to transmit a session release reject message to the UE, wherein the session release reject message includes cause information informing that the session needs to be always-on or always-connected for the UE, and wherein the cause information is used by the UE for transmitting a session modification request message when the UE determines that the session needs to be released.

12. The CP function entity of claim 11, wherein the processor is further configured to perform the determination based on one or more of a type of the UE, preconfigured information, or policy information of a service provider.

13. The CP function entity of claim 11, wherein the processor is further configured to:

control the transceiver to transmit a policy information request including a request for a decision to a policy control function (PCF) entity, wherein the decision regards whether to create the session, which needs to be always-on or always-connected for the UE; and control the transceiver to receive a policy information response including a decision result.

14. The CP function entity of claim 11, wherein, the processor is further configured to:

determine to release the session, which needs to be always-on or always-connected; and update session context to modify attribute of the session into that of a session which needs not be always-on or always-connected.

15. The CP function entity of claim 14, wherein the processor is further configured to:

control the transceiver to transmit a session modification request message to the UE to request modification of the attribute of the session;

control the transceiver to receive a session modification response message in response to the session modification request message; and control the transceiver to transmit a session release request message to the UE.

16. The CP function entity of claim 14, wherein the processor is configured to:

control the transceiver to transmit a request requesting to make a decision about whether to release the session, which needs to be always-on or always-connected, to a policy control function (PCF) entity; and control the transceiver to receive a decision result by the PCF entity.

17. The CP function entity of claim 11, wherein the processor is further configured to:

control the transceiver to receive the session modification request message from the UE to modify the session into one which needs not be always-on or always-connected;

update context of the session for modifying the session into one which needs not be always-on or always-connected; and transmit a response message in response to a session modification request which induces session context update of the UE.

18. The CP function entity of claim 11, wherein the session release reject message is transmitted to the UE, (i) based on that the session, which needs to be always-on or always-connected for the UE, is not released until the UE is detached from the core network, and (ii) based on that the UE is attached to the core network.

* * * * *